US011885055B2

(12) United States Patent
Minamikawa et al.

(10) Patent No.: US 11,885,055 B2
(45) Date of Patent: Jan. 30, 2024

(54) SEWING SYSTEM AND CUTTING DEVICE

(71) Applicant: BROTHER KOGYO KABUSHIKI KAISHA, Nagoya (JP)

(72) Inventors: Kanae Minamikawa, Nagoya (JP); Mayumi Nishizaki, Nagoya (JP)

(73) Assignee: BROTHER KOGYO KABUSHIKI KAISHA, Nagoya (JP)

(*) Notice: Subject to any disclaimer, the term of this patent is extended or adjusted under 35 U.S.C. 154(b) by 107 days.

(21) Appl. No.: 17/702,987

(22) Filed: Mar. 24, 2022

(65) Prior Publication Data
US 2022/0316113 A1 Oct. 6, 2022

(30) Foreign Application Priority Data
Mar. 31, 2021 (JP) .................. 2021-059066

(51) Int. Cl.
*D05B 19/10* (2006.01)
*D05B 19/08* (2006.01)

(52) U.S. Cl.
CPC ........... *D05B 19/10* (2013.01); *D05B 19/085* (2013.01); *D05D 2205/18* (2013.01); *G05B 2219/2626* (2013.01)

(58) Field of Classification Search
CPC ........ D05B 19/00; D05B 19/02; D05B 19/04; D05B 19/06; D05B 19/08; D05B 19/085; D05B 19/10; D05B 19/105; D05B 19/12; D05C 5/02; D05C 5/04; D05C 5/06; D05C 7/08; G05B 2219/2626; D05D 2305/08
See application file for complete search history.

(56) References Cited

U.S. PATENT DOCUMENTS

| | | | | |
|---|---|---|---|---|
| 5,740,055 A * | 4/1998 | Iwata | ..... | D05B 19/08 112/80.23 |
| 5,782,189 A * | 7/1998 | Hirata | ..... | G05B 19/106 112/458 |
| 5,970,894 A * | 10/1999 | Mase | ..... | D05B 19/02 112/102.5 |
| 6,216,618 B1 * | 4/2001 | Goldberg | ..... | D05B 19/02 112/155 |
| 8,069,091 B1 * | 11/2011 | Callen, Jr. | ..... | G06Q 30/0603 705/26.5 |
| 8,276,531 B2 * | 10/2012 | Tashiro | ..... | D05C 5/04 112/102.5 |
| 9,121,120 B2 * | 9/2015 | Ciaramitaro | ..... | D06Q 1/10 |

(Continued)

FOREIGN PATENT DOCUMENTS

| | | | | |
|---|---|---|---|---|
| JP | 08100363 A | * | 4/1996 | |
| JP | 08141247 A | * | 6/1996 | |

(Continued)

*Primary Examiner* — Danny Worrell
(74) *Attorney, Agent, or Firm* — K&L Gates LLP

(57) ABSTRACT

A sewing system includes a cutting device and a sewing machine. The cutting device acquires the cutting data and send the cutting data via at least one of the network line or at least one of the wireless communication by the cutter communication portion. The sewing machine receives the cutting data sent by the cutting device via at least one of the network line or at least one of the wireless communication. The sewing machine generates the embroidery data, based on the cutting data received by the sewing machine. The sewing machine sews on the object to be sewn, based on the generated embroidery data.

18 Claims, 16 Drawing Sheets

(56) References Cited

U.S. PATENT DOCUMENTS

| | | | |
|---|---|---|---|
| 9,492,937 B2* | 11/2016 | Bailie | D05C 5/06 |
| 9,951,449 B2* | 4/2018 | Gieskes | D05B 19/12 |
| 2004/0083022 A1* | 4/2004 | Akira | D05B 19/085 |
| | | | 700/138 |
| 2013/0035780 A1* | 2/2013 | Abe | D05C 5/04 |
| | | | 112/102.5 |
| 2015/0259841 A1* | 9/2015 | Ihira | D05B 81/00 |
| | | | 112/102.5 |
| 2018/0340280 A1* | 11/2018 | Maki | G05B 15/02 |
| 2022/0112640 A1* | 4/2022 | Morimoto | D05B 19/12 |
| 2022/0316113 A1* | 10/2022 | Minamikawa | D05C 7/08 |
| 2022/0316117 A1* | 10/2022 | Nishizaki | D05B 37/04 |

FOREIGN PATENT DOCUMENTS

| | | | | |
|---|---|---|---|---|
| JP | 2002233990 A | | 8/2002 | |
| JP | 2004141471 A | | 5/2004 | |
| JP | 2011083510 A | * | 4/2011 | ............ D05B 19/10 |
| JP | 2016144605 A | | 8/2016 | |
| WO | WO-2017090294 A1 | * | 6/2017 | ............ D05B 19/08 |
| WO | WO-2017110329 A1 | * | 6/2017 | ............ D05B 19/08 |

* cited by examiner

SEWING SYSTEM AND CUTTING DEVICE

CROSS-REFERENCE TO RELATED APPLICATIONS

This application claims priority to Japanese Patent Application No. 2021-059066, filed Mar. 31, 2021. The disclosure of the foregoing application is incorporated herein by reference in its entirety.

BACKGROUND

The present disclosure relates to a sewing system and a cutting device.

A cutting device cuts a pattern of a desired shape from an object by moving a cutting head and a sheet-like object relative to one another on the basis of cutting data. A sewing machine performs applique sewing by sewing the pattern cut by the cutting device onto processed fabric, on the basis of applique data.

SUMMARY

Applique sewing with a sewing machine can be efficiently performed by the sewing machine performing applique sewing on the basis of cutting data acquired from a cutting device. In the past, however, the sewing machine was unable to perform applique sewing in cooperation with the cutting device.

The object of the present disclosure is to provide a sewing system, and a cutting device, in which a sewing machine works in cooperation with the cutting device and is able to sew a cut pattern cut by the cutting device.

Various embodiments herein provide a sewing system that includes a cutting device and a sewing machine. The cutting device includes a cutting portion, a cutter communication portion, a cutter processor and a cutter memory. The cutting portion is configured to cut an object to be cut held by a holding frame, based on cutting data for cutting a cutting pattern formed from at least one partial pattern. The cutter communication portion is configured to perform communication via at least one of a network line or at least one of wireless communication. The cutter memory is configured to store computer-readable instructions that, when executed by the cutter processor, instruct the cutter processor to perform processes. The process includes a cutter first acquisition process, and a cutter send process. The cutter first acquisition process acquires the cutting data. The cutter send process sends, via at least one of the network line or at least one of the wireless communication by the cutter communication portion, the cutting data acquired by the cutter first acquisition process. The sewing machine includes a sewing portion, a sewing communication portion, a sewing processor, and a sewing memory. The sewing portion is configured to sew an embroidery pattern onto an object to be sewn held by an embroidery frame, based on embroidery data for sewing the embroidery pattern. The sewing communication portion is configured to perform communication via at least one of the network line or at least one of the wireless communication. The sewing memory is configured to store computer-readable instructions that, when executed by the sewing processor, instruct the sewing processor to perform processes. The processes include a sewing receiving process, a generation process, and a sewing process. The sewing receiving process receives, via at least one of the network line or at least one of the wireless communication by the sewing communication portion, the cutting data sent by the cutting device. The generation process generates the embroidery data, based on the cutting data received by the sewing receiving process. The sewing process sews on the object to be sewn, based on the embroidery data generated by the generation process.

The sewing machine receives, via the network line or wireless communication, cutting data sent from the cutting device, and generates embroidery data on the basis of the received cutting data. The sewing machine can acquire the cutting data from the cutting device by linking up with the cutting device, and generate the embroidery data required for sewing.

Various embodiments herein provide a cutting device that includes a cutting portion, a cutter communication portion, a cutter processor, and a cutter memory. The cutting portion is configured to cut an object to be cut held by a holding frame, based on cutting data for cutting a cutting pattern formed from at least one partial pattern. The cutter communication portion is configured to perform communication via at least one of a network line or at least one of wireless communication. The cutter memory is configured to store computer-readable instructions that, when executed by the cutter processor, instruct the cutter processor to perform processes. The processes include a cutter first acquisition, a size specification process, and a cutter send process. The cutter first acquisition process acquires the cutting data. The size specification process specifies size information indicating the size of the at least one partial pattern. The cutter send process sends, to another device via at least one of the network line or at least one of the wireless communication by the cutter communication portion, the cutting data acquired by the cutter first acquisition process, and the size information specified by the size specification process.

The cutting device can send the required cutting data to another device. The other device can determine, from size information, whether at least one partial pattern will fit in the processable region when processing the at least one partial pattern on the basis of the cutting data.

BRIEF DESCRIPTION OF THE DRAWINGS

Embodiments of the disclosure will be described below in detail with reference to the accompanying drawings in which.

DETAILED DESCRIPTION

A system 1 according to the present disclosure will be described with reference to the drawings. The drawings that are referenced are used to illustrate the technical characteristics that can be employed by the present disclosure. The configurations and the like of the devices that are described are not intended to be limited thereto, but are merely illustrative examples.

Outline of the System 1

Figure 1:
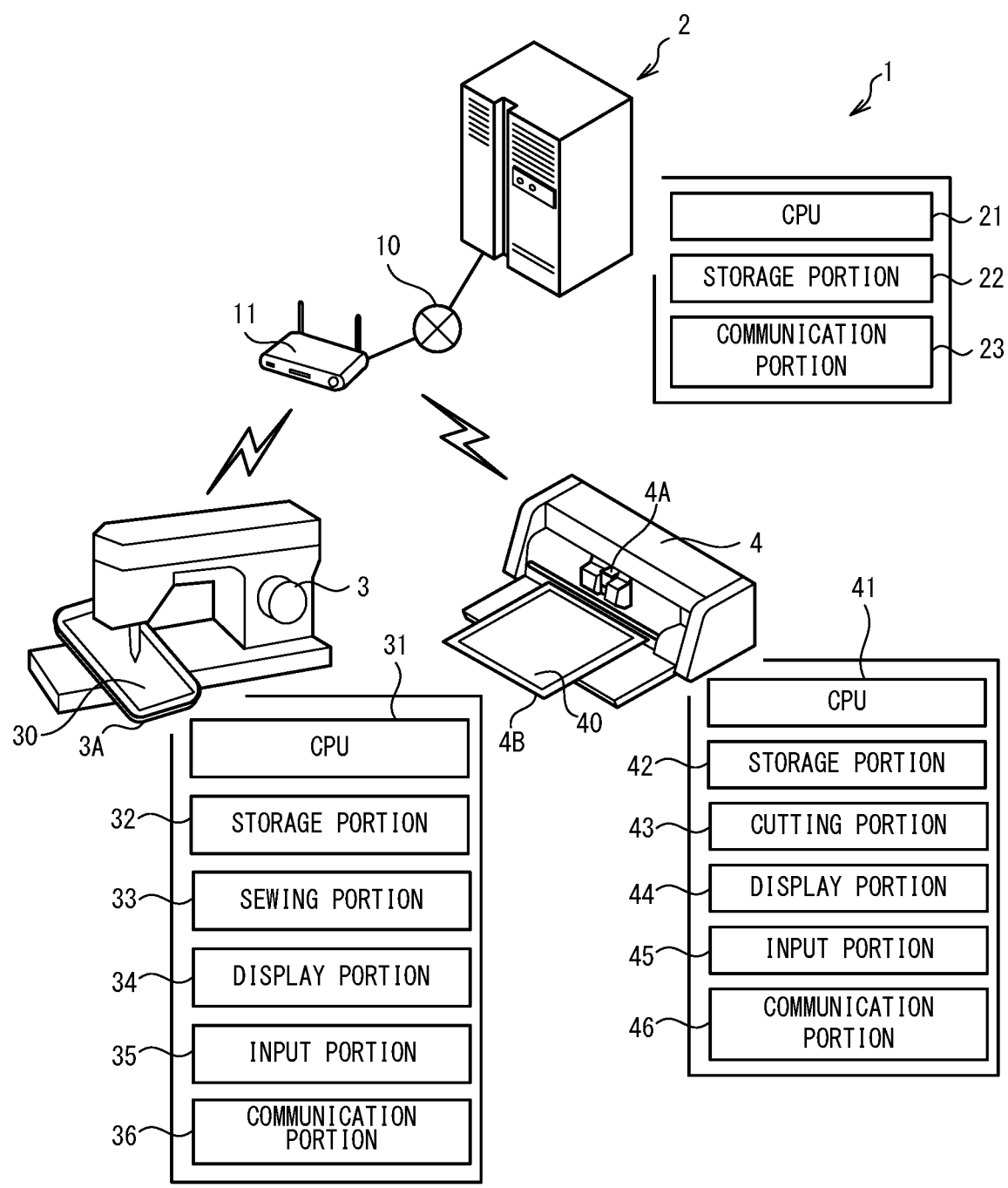
FIG. 1 is a view of an outline of a system.

An outline of the system 1 will be described with reference to FIG. 1. The system 1 has a server device 2, a sewing machine 3, and a cutting device 4. The server device 2 communicably connects to an access point 11 via a network line 10. The sewing machine 3 and the cutting device 4 both communicably connect wirelessly to the access point 11. Therefore, the server device 2, the sewing machine 3, and the cutting device 4 are able to communicate with each another via the network line 10 and the access point 11.

The server device 2 has a CPU 21, a storage portion 22, and a communication portion 23. The CPU 21 is responsible for overall control of the server device 2. A server program to be executed by the CPU 21, and embroidery data and cutting data and the like, which will be described later, are stored in the storage portion 22. The communication portion 23 is a communication module for performing communication with the sewing machine 3 and the cutting device 4 via the network line 10 and the access point 11.

The sewing machine 3 has a function of sewing an embroidery pattern onto an object 30 to be sewn. The sewing machine 3 has a CPU 31, a storage portion 32, a sewing portion 33, a display portion 34, an input portion 35, and a communication portion 36. A sewing machine program to be executed by the CPU 31, embroidery data for sewing the embroidery pattern, cutting data for the cutting device 4 to cut an object 40 to be cut, and first frame information, and the like are stored in the storage portion 32. The first frame information indicates a first sewable region 59 (refer to FIG. 15) that will be described later. The sewing portion 33 has an upper shaft drive portion and an embroidery frame movement portion. The upper shaft drive portion reciprocally drives a sewing needle connected to a needle bar, not shown in the drawings, up and down. The embroidery pattern movement portion moves an embroidery frame 3A that holds the object 30 to be sewn. The CPU 31 controls the sewing portion 33 on the basis of the sewing data stored in the storage portion 32 and simultaneously drives the upper shaft drive portion and the embroidery frame movement portion so as to sew the embroidery pattern on the object 30 to be sewn that is held by the embroidery frame 3A.

The display portion 34 is a liquid crystal display. The input portion 35 is a touch panel provided on the surface of the display portion 34. The communication portion 36 is a communication module for communicating with the server device 2 via the network line 10 and the access point 11.

The cutting device 4 cuts an object 40 to be cut, using a cutting blade of a cartridge 4A. The cutting device 4 has a CPU 41, a storage portion 42, a cutting portion 43, a display portion 44, an input portion 45, and a communication portion 46. The CPU 41 is responsible for the overall control of the cutting device 4. A cutting program to be executed by the CPU 41, the embroidery data, the cutting data, first item information, second item information, and second frame information and the like are stored in the storage portion 42. The first item information indicates editable items A to C (refer to FIG. 6) that will be described later. The second item information indicates a non-compliant item that will be described later. The second frame information indicates a second sewable region 57 (refer to FIG. 12) that will be described later.

The cutting portion 43 has a conveyance mechanism, a first movement mechanism, and a second movement mechanism. The conveyance mechanism conveys, in a sub-scanning direction, a holding frame 4B that holds the object 40 to be cut on an upper surface thereof. The first movement mechanism moves the cartridge 4A in a main scanning direction. The second movement mechanism moves the cartridge 4A in an up-down direction orthogonal to the main scanning direction and the sub-scanning direction. The CPU 41 controls the cutting portion 43 in the following manner on the basis of the cutting data stored in the storage portion 42. The CPU 41 controls the second movement mechanism to move the cartridge 4A downward such that the cutting blade and the object 40 to be cut come into contact with one another. In this state, the CPU 41 controls the conveyance mechanism and the first movement mechanism to move the holding frame 4B and the cartridge 4A. As a result, the cutting blade moves relative to the object 40 to be cut in the main scanning direction and the sub-scanning direction, and cuts the object 40 to be cut.

The display portion 44 is a liquid crystal display. The input portion 45 is a touch panel provided on the surface of the display portion 44. The communication portion 46 is a communication module for communicating with the server device 2 via the network line 10 and the access point 11.

Operation Outline of the System 1

Figure 2:
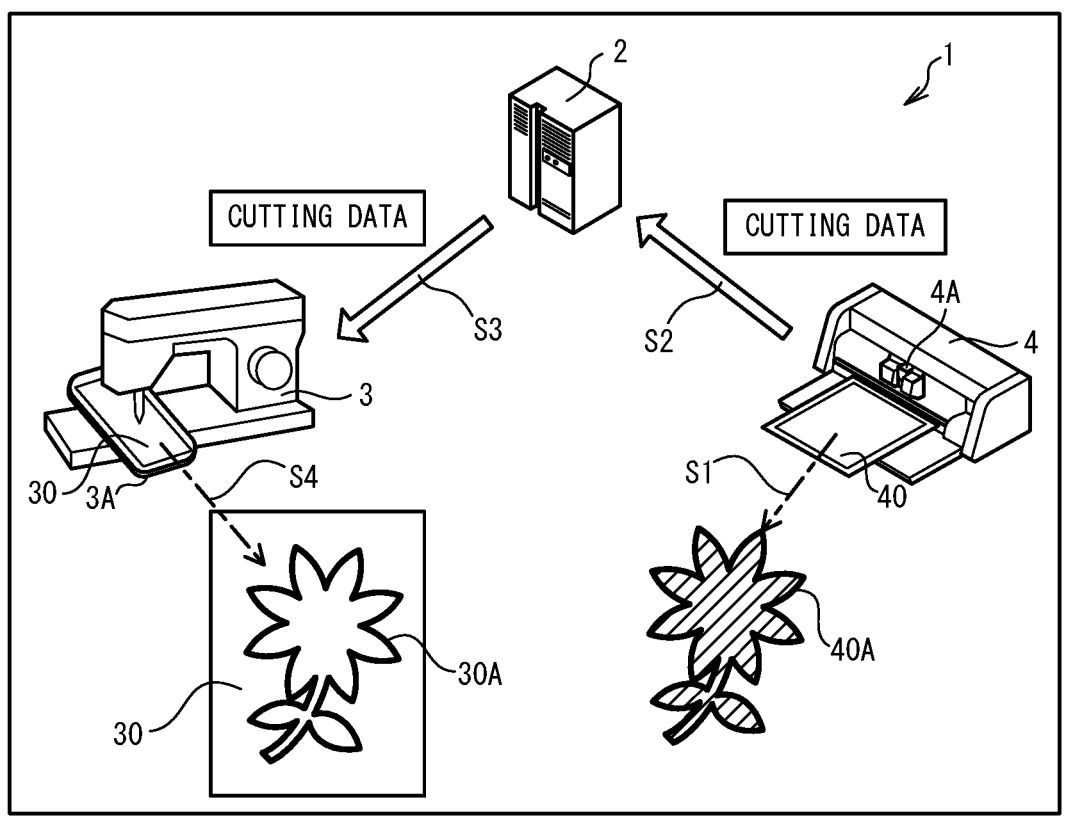
FIG. 2 is an explanatory view of an operation outline of the system.

As illustrated in FIG. 2, the cutting device 4 drives the cutting portion 43 on the basis of cutting data stored in the storage portion 42 (refer to FIG. 1), and cuts a cutting pattern 40A from the object 40 to be cut (step S1). Also, the cutting device 4 sends cutting data to the server device 2 via the network line 10 and the access point 11 (step S2). The server device 2 receives the cutting data sent from the cutting device 4, and stores it in the storage portion 22 (refer to FIG. 1).

The sewing machine 3 receives the cutting data sent from the server device 2 (step S3). The sewing machine 3 then generates embroidery data for sewing an embroidery pattern 30A corresponding to the cutting pattern 40A, on the basis of the received cutting data. The sewing machine 3 then drives the sewing portion 33 (refer to FIG. 1), and sews the embroidery pattern 30A onto the object 30 to be sewn on the basis of the generated embroidery data (step S4).

Cutting Pattern 5 and Cutting Data D1

Figure 3:
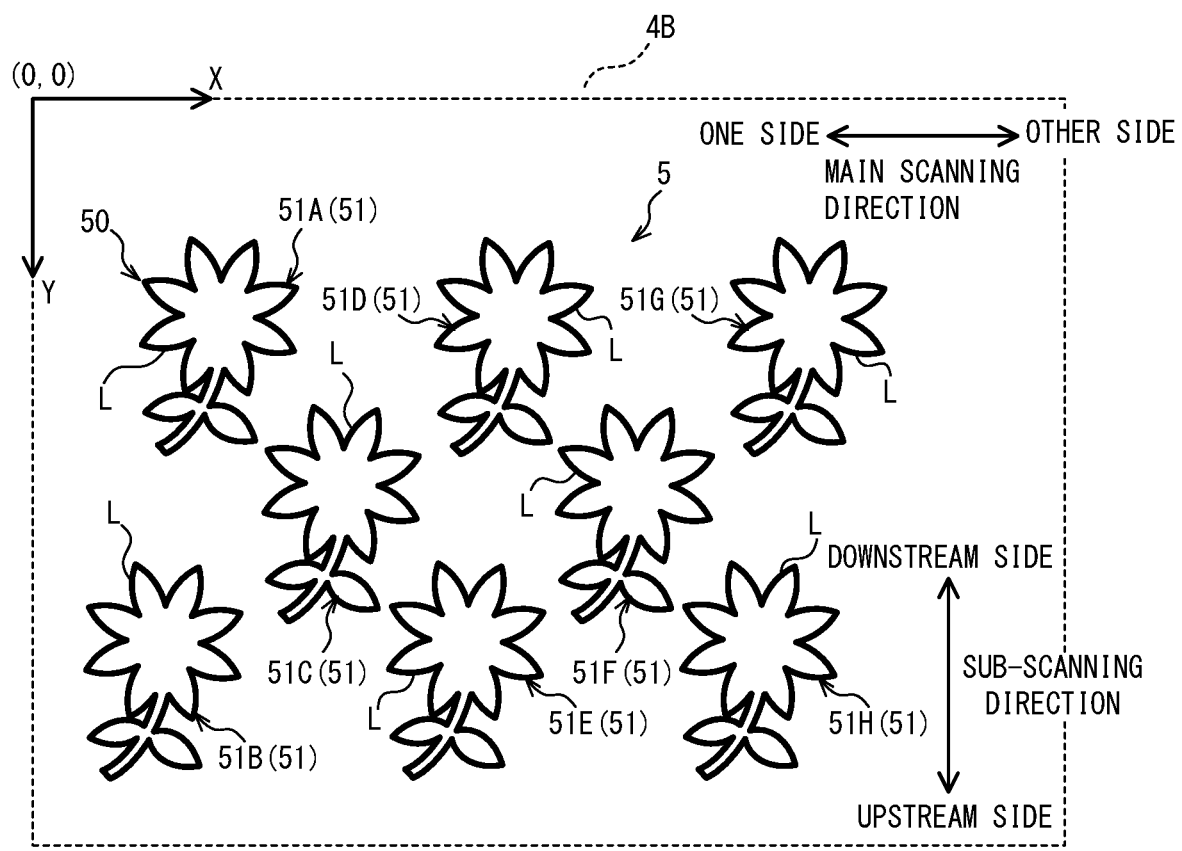
FIG. 3 is a view of a cutting pattern.

The cutting pattern to be cut by the cutting device 4 on the basis of the cutting data will be described giving a specific example. A cutting pattern 5 illustrated in FIG. 3 is formed by a plurality of partial patterns 50 (partial patterns 51A to 51H). The partial patterns 51A to 51H are each indicated by lines (hereinafter, referred to as "cutting lines L") indicating the outlines of flowers. The partial patterns 51A to 51H all have the same shape. Hereinafter, the partial patterns 51A to 51H may be referred to as "partial patterns 51" unless otherwise specified.

Figure 4:
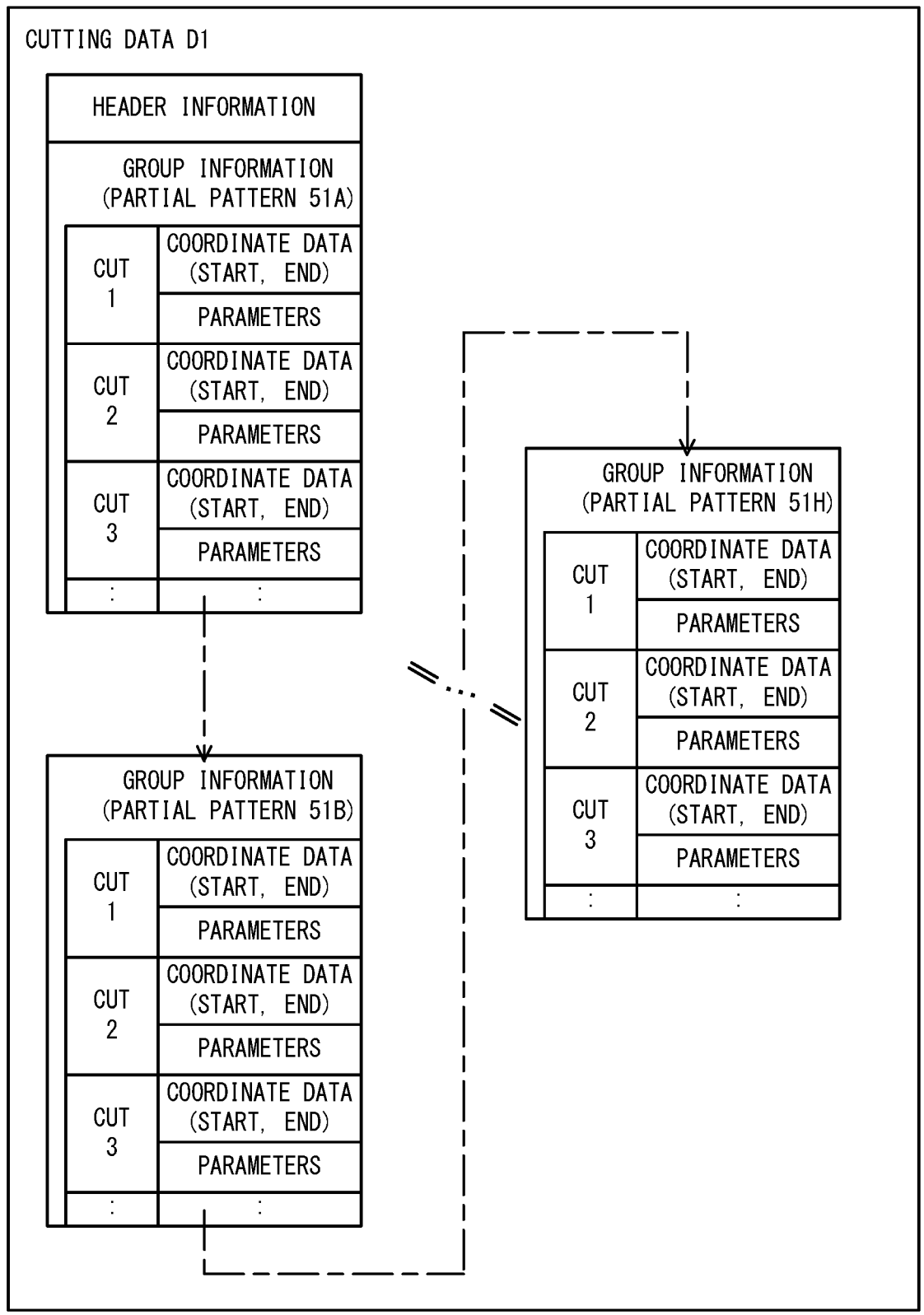
FIG. 4 is a view of cutting data.

FIG. 4 schematically shows cutting data D1 for cutting the cutting pattern 5 illustrated in FIG. 3. The cutting data D1 includes header information, start point and end point coordinate data, and control parameters, and the like. In FIG. 4, the control parameters are referred to as "parameters".

The header information includes initial information (the type of each of the holding frame 4B, the object 40 to be cut, and the cartridge 4A), and setting information and like described later. The coordinate data indicates the positions of the start point and the end point of each line segment (hereinafter, referred to as a "cut line") obtained by dividing the cutting line L into a plurality of segments. As illustrated in FIG. 3, the X-axis direction of the coordinate system of the coordinate data corresponds to the main scanning direction, and the Y-axis direction corresponds to the sub-scanning direction. The origin (0, 0) of the coordinate system of the coordinate data coincides with the corner of the end portion of the holding frame 4B on one side in the main scanning direction, and the end portion of the holding frame 4B on the downstream side in the sub-scanning direction. The positive direction of the X-axis corresponds to the direction toward the other side in the main scanning direction. The negative direction of the X-axis corresponds to the direction toward the one side in the main scanning direction. The positive direction of the Y-axis corresponds to the direction toward the upstream side in the sub-scanning direction. The negative direction of the Y-axis corresponds to the direction toward the downstream side in the sub-scanning direction. As illustrated in FIG. 4, the control parameters specify the control conditions and the like when controlling each of the conveyance mechanism, the first movement mechanism, and the second movement mechanism of the cutting portion 43 when the cutting device 4 cuts each of the cut lines.

The coordinate data and the control parameters are specified for each cut line. Hereinafter, a set of coordinate data and control parameters specified for each cut line will be referred to as a "record". Also, each record is divided by the cutting line L to which the corresponding cut line belongs. Also, group information indicating the partial patterns 51 whose outlines are defined by the cutting lines L is associated with each of the plurality of records divided by the cutting lines L.

Cutting Main Process

A cutting main process executed by the CPU 41 of the cutting device 4 will be described with reference to FIG. 5. The cutting main process starts in response to the CPU 41 reading and executing the cutting program stored in the storage portion 42, when an operation to specify the cutting pattern and start cutting the object 40 to be cut, or an operation to specify the cutting pattern and send cutting data, is performed by the user via the input portion 45. Hereinafter, a case in which the cutting pattern 5 illustrated in FIG. 3 has been specified by the user will be described in detail as an example.

If the CPU 41 determines that an operation to specify the cutting pattern 5 and start cutting the object 40 to be cut is being performed (yes at step S11), the CPU 41 reads and acquires, from the storage portion 42, the cutting data D1 (refer to FIG. 4) for cutting the specified cutting pattern 5 (step S13). The CPU 41 further acquires, on the basis of the first item information stored in the storage portion 42, items (hereinafter, referred to as "editable items") A to C that can be edited with respect to the cutting data D1 of the cutting pattern 5 (step S15). Specific examples of the editable items A to C are smoothing of the cutting line L, seam allowance setting, fill setting, and line addition, etc.

The CPU 41 displays, on the display portion 44, a preview image 60A (refer to FIG. 6) for previewing the cutting pattern 5 to be cut by the cutting device 4 on the basis of the cutting data D1 (step S17). Further, the CPU 41 displays, on the display portion 44, an editing image 60B (refer to FIG. 6) for editing the cutting data D1 on the basis of the editable items A to C acquired by the processing at step S15 (step S19).

Figure 5:
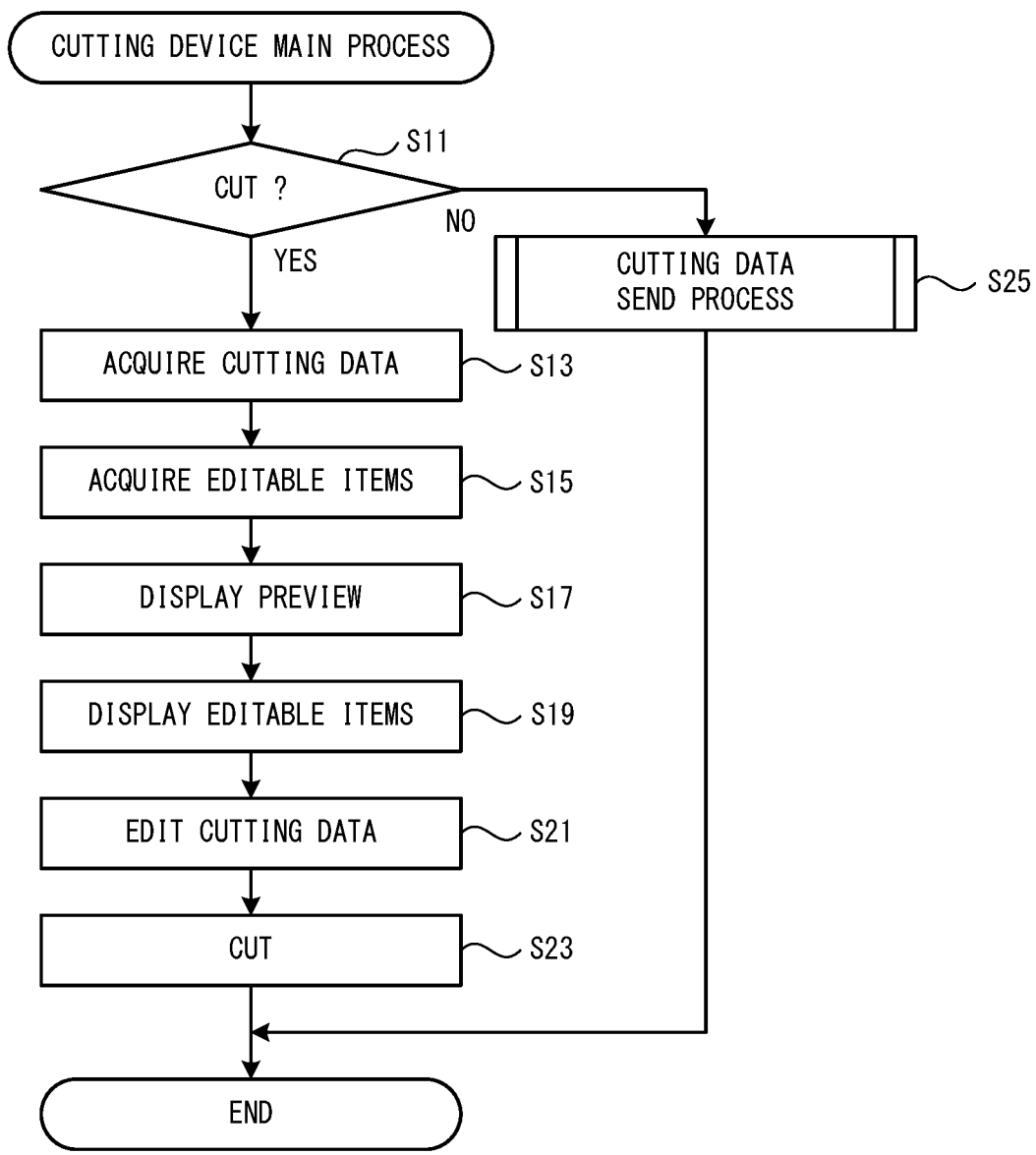
FIG. 5 is a flowchart of a cutting main process.
Figure 6:
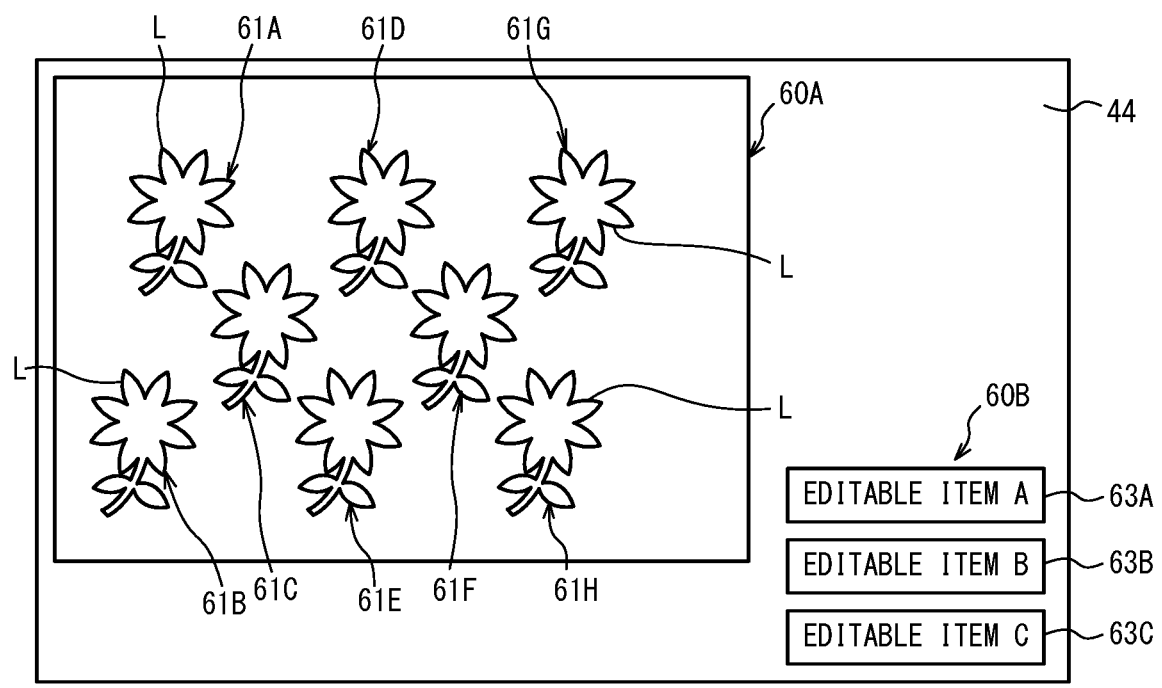
FIG. 6 is a view of a preview image and an editing image.

FIG. 6 illustrates the preview image 60A and the editing image 60B displayed on the display portion 44 by the processing at steps S17 and S19 (refer to FIG. 5). As the preview image 60A, pattern images 61A to 61H showing the partial patterns 51A to 51H (refer to FIG. 3), respectively, are displayed by the cutting line L (refer to FIG. 3) specified based on the coordinate data included in the cutting data D1. The editing image 60B includes selection buttons 63A to 63C for selecting each of the editable items A to C.

As illustrated in FIG. 5, the CPU 41 detects, via the input portion 45, an operation to select any of the selection buttons 63A to 63C in the editing image 60B. The CPU 41 edits the cutting data D1 by an editing method corresponding to the editable items A to C corresponding to the selection buttons 63A to 63C that have been selected (step S21). The CPU 41 then controls the conveyance mechanism, the first movement mechanism, and the second movement mechanism on the basis of the edited cutting data D1, and cuts the object 40 to be cut (step S23).

More specifically, the CPU 41 first controls the second movement mechanism to move the cartridge 4A downward so that the cutting blade contacts the object 40 to be cut. Next, the CPU 41 controls, on the basis of the coordinate data of the cutting data D1, the conveyance mechanism and the first movement mechanism such that the position of the cutting blade with respect to the object 40 to be cut moves relatively from the start point to the end point. The cut lines are formed one by one on the object 40 to be cut by repeating this operation for each record of the cutting data D1. Also, a piece corresponding to each of the partial patterns 51A to 51H (refer to FIG. 3) is cut from the object 40 to be cut by repeating the aforementioned process for all of the records associated with each piece of group information. The CPU 41 then ends the cutting main process.

On the other hand, if the CPU 41 determines that an operation to specify the cutting pattern 5 and send the cutting data D1 is being performed (no at step S11), the CPU 41 executes a cutting data send process (refer to FIG. 7), which will be described later (step S25). After ending the cutting data send process, the CPU 41 ends the cutting main process.

The cutting data send process will be described with reference to FIG. 7. The CPU 41 reads and acquires, from the storage portion 42, the cutting data D1 (refer to FIG. 4) for cutting the specified cutting pattern 5 (step S31). The CPU 41 then determines whether the setting information included in the header information of the acquired cutting data D1 includes setting information (hereinafter, also referred to as "sewing machine-inexecutable information") that the sewing machine 3 is unable to execute during sewing (step S33). The seam allowance setting is one example of sewing machine-inexecutable information. The seam allowance setting is a setting to set an outer line that is separated from, to the outside of, the outline of the cutting pattern 5 as a new cutting line L.

If the CPU 41 determines that the setting information of the header information includes sewing machine-inexecutable information (yes at step S33), the CPU 41 deletes the sewing machine-inexecutable information from the header information (step S35). The CPU 41 then moves the processing on to step S37. On the other hand, if the CPU 41 determines that the setting information of the header information does not include sewing machine-inexecutable information (no at step S33), the CPU 41 moves the processing on to step S37.

The CPU 41 acquires the editable items A to C (refer to FIG. 6) on the basis of the first item information stored in the storage portion 42 (step S37). Moreover, the CPU 41 acquires, on the basis of the second item information stored in the storage portion 42, an editable item indicative of an editing method related to processing that the sewing machine 3 is unable to support during sewing (hereinafter, referred to as an "non-supported editable item"). The CPU 41 determines whether the acquired non-supported editable item is included in the editable items A to C (step S39). The fill setting is one example of an editing method corresponding to the non-supported editable item. The fill setting is an editing method for filling in the outline of the cutting pattern 5 when the cartridge 4A to which a pen instead of a cutting blade is mounted, is attached to the cutting device 4 and used.

If the CPU 41 determines that a non-supported editable item is included in the editable items A to C (yes at step S39), the CPU 41 sets the non-supported editable item as a hidden item in order to remove the non-supported editable item from the editable item options displayed on the display portion 44 by the processing at step S45 that will be described later (step S41). The CPU 41 then moves the processing on to step S43. On the other hand, if the CPU 41 determines that a non-supported editable item is not included in the editable items A to C acquired by the processing at step S37 (no at step S39), the CPU 41 moves the processing on to step S43.

The CPU 41 displays, on the display portion 44, a preview image 70A (refer to FIG. 9) for previewing the embroidery pattern to be sewn by the sewing machine 3 on the basis of the cutting data D1 (step S43). Moreover, the CPU 41 displays, on the display portion 44, an editing image 70B (refer to FIG. 9) on the basis of the editable items A to C acquired by the processing at step S37 (step S45).

Figure 9:
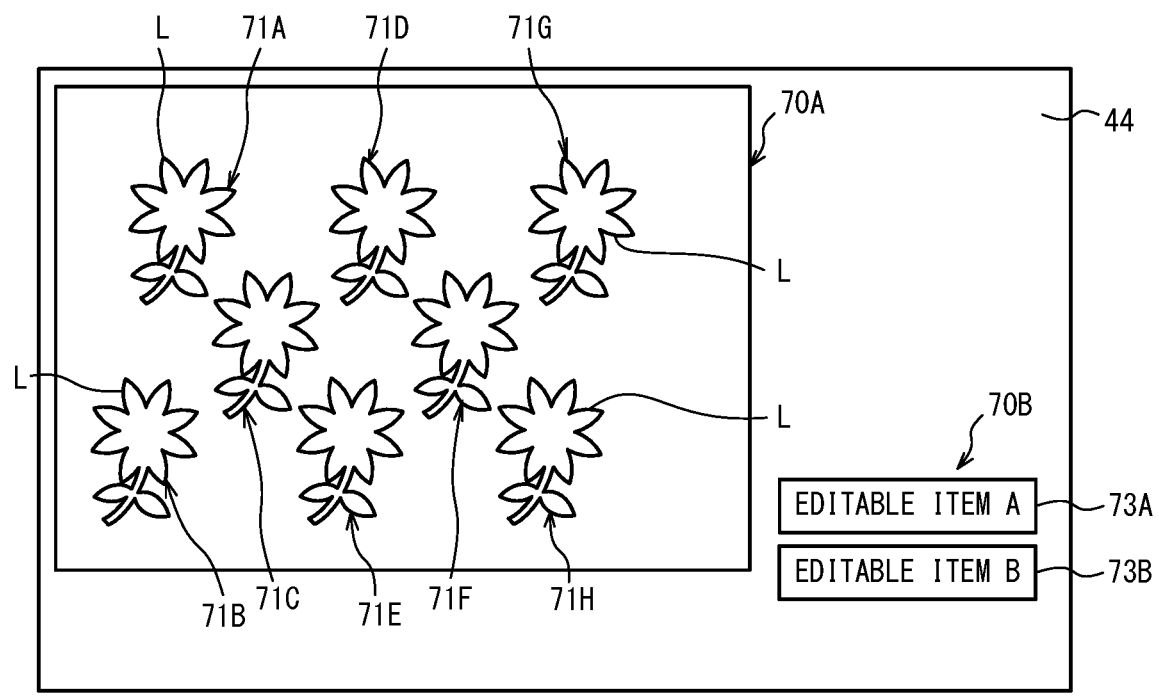
FIG. 9 is a view of a preview image and an editing image.

FIG. 9 illustrates an example of the preview image 70A and the editing image 70B displayed on the display portion 44. The preview image 70A includes pattern images 71A to 71H showing the partial patterns 51A to 51H, respectively. The editing image 70B includes selection buttons 73A and 73B for selecting the editable items A and B. The CPU 41 displays the preview image 70A and the editing image 70B by the display method illustrated below.

Figure 7:
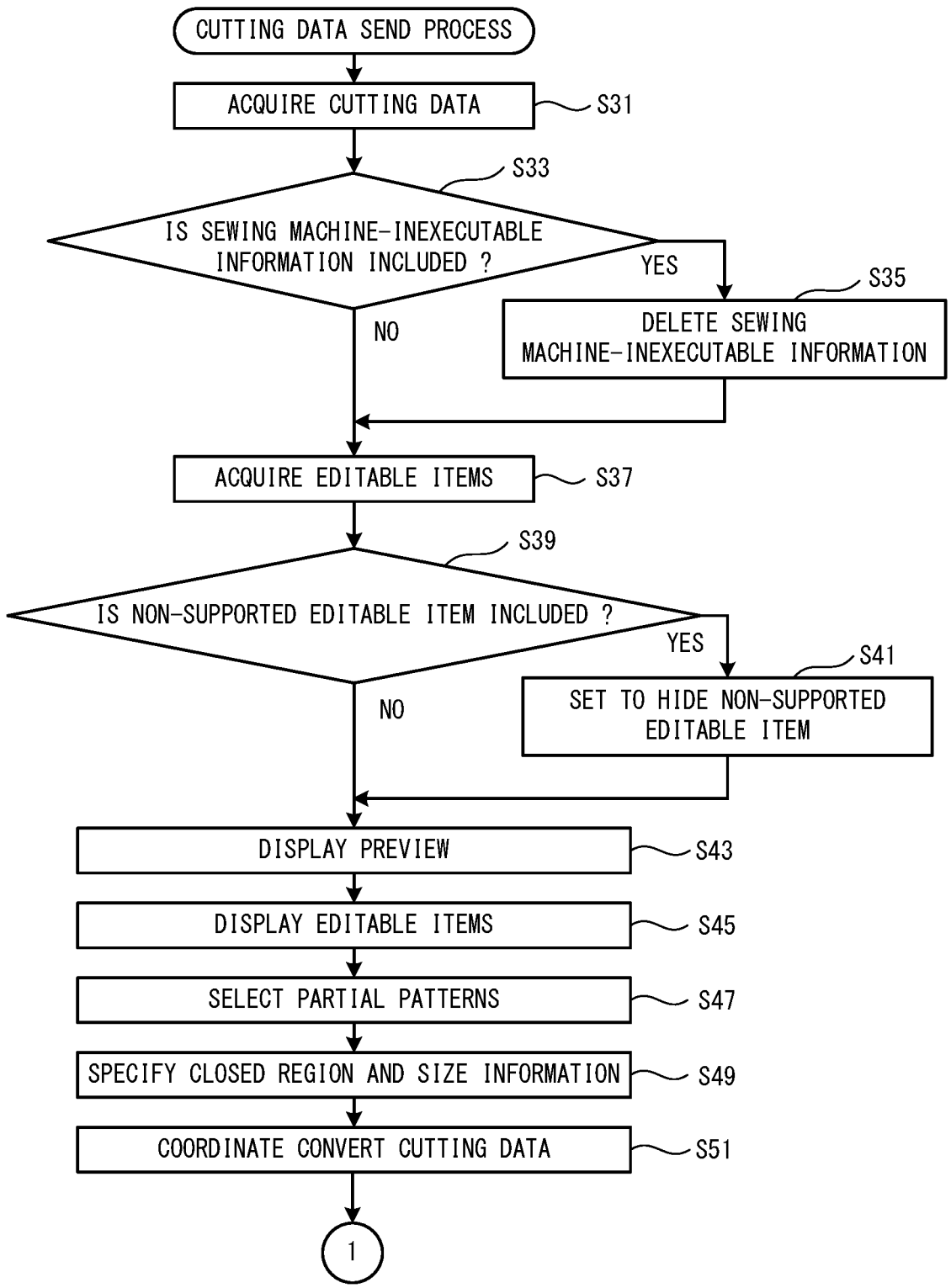
FIG. 7 is a flowchart of a cutting data send process.

If sewing machine-inexecutable information has been deleted from the header information in the cutting data D1 by the processing at step S35 in FIG. 7, the CPU 41 specifies the cutting line L (refer to FIG. 3) of the partial patterns 51A to 51H on the basis of the cutting data D1 from which the sewing machine-inexecutable information has been deleted. The CPU 41 displays the specified cutting line L as the pattern images 71A to 71H (refer to FIG. 9) on the display portion 44. Note that the pattern images 71A to 71H differ from the pattern images 61A to 61H in the preview image 60A (refer to FIG. 6) displayed on the display portion 44 when cutting is to be performed by the cutting device 4. The reason for this is that in the pattern images 61A to 61H displayed by the preview image 60A, the cutting line L is specified by using the cutting data D1 as it is, whereas in the pattern images 71A to 71H in the preview image 70A (refer to FIG. 9), the cutting line L is specified on the basis of the cutting data D1 in which the sewing machine-inexecutable information has been deleted from the header information. By deleting the sewing machine-inexecutable information from the header information, settings that the sewing machine 3 is unable to execute during sewing are excluded, so the pattern images 71A to 71H well reflect the embroidery pattern sewn by the sewing machine 3 on the basis of the cutting data D1.

On the other hand, if the processing at step S35 in FIG. 7 has not been performed, such that the sewing machine-inexecutable information has not been deleted from the header information in the cutting data D1, the CPU 41 specifies the cutting line L (refer to FIG. 3) of the plurality of partial patterns 50 using the cutting data D1 acquired by the processing at step S31 as it is. The CPU 41 then displays the specified cutting line L as the pattern images 71A to 71H (refer to FIG. 9). In this case, the pattern images 71A to 71H match the pattern images 61A to 61H in the preview image 60A (refer to FIG. 6) displayed on the display portion 44 when cutting is to be performed by the cutting device 4. In other words, the pattern images 71A to 71H show the embroidery pattern that is to be sewn by the sewing machine 3, in the same manner as the cutting pattern to be cut by the cutting device 4 on the basis of the cutting data D1.

Also, the editing image 70B in FIG. 9 shows the results in which the editable item C, from among the editable items A to C acquired by the processing at step S37 in FIG. 7, corresponds to the non-supported editable item, and the editable item C is set as a hidden item by the processing in S41 in FIG. 7. The CPU 41 displays, as the editing image 70B, the selection buttons 73A and 73B of the editable items A and B, excluding the editable item C that is the non-supported editable item, from among the editable items A to C. The selection button corresponding to the editable item C is hidden. Note that the non-supported editable item indicates an editing method relating to processing unable to be supported by the sewing machine 3 during sewing. Therefore, the cutting device 4 can prevent the cutting data D1 from being edited by the editing method relating to processing unable to be supported by the sewing machine 3 during sewing by hiding the selection button corresponding to the editable item C.

Note that when cutting by the cutting device 4 is to be performed, all of the selection buttons 63A to 63C corresponding to the editable items A to C are displayed in the editing image 60B (refer to FIG. 6) displayed on the display portion 44. That is, during cutting by the cutting device 4, the selection button 63C of the non-supported editable item is also displayed, which is different from when the cutting data D1 is sent to the sewing machine 3.

On the other hand, for example, if the processing at step S41 in FIG. 7 is not performed and the non-supported editable item is not set as the hidden item, all of the selection buttons of the editable items A to C acquired by the processing at step S37 in FIG. 7 are displayed as the editing image 70B. The selection buttons displayed in this case match the selection buttons 63A to 63C (refer to FIG. 6) of the editing image 60B displayed on the display portion 44 when cutting by the cutting device 4 is to be performed.

By performing an operation to select at least one of the pattern images 71A to 71H included in the preview image 70A, the user is able to select the partial patterns 51 to be sewn as the embroidery pattern, from among the plurality of partial patterns 50, by the sewing machine 3. As illustrated in FIG. 7, the CPU 41 receives the operation to select at least one of the pattern images 71A to 71H, and selects the partial patterns 51 to be sewn as the embroidery pattern by the sewing machine 3 (step S47). Hereinafter, a case in which the user performs an operation to select the pattern images 71B to 71H, excluding the pattern image 71A, will be described in detail as an example. In this case, the CPU 41 selects the partial patterns 51B to 51H (refer to FIG. 3) corresponding to the pattern images 71B to 71H, by the processing at step S47.

The CPU 41 extracts the header information of the cutting data D1, the record associated with the group information of the partial patterns 51B to 51H selected by the processing at step S47, and the group information. The CPU 41 stores, in the storage portion 42, the extracted header information and the record associated the group information of the partial patterns 51B to 51H, as the cutting data D2 to be sent to the sewing machine 3.

Figure 10:
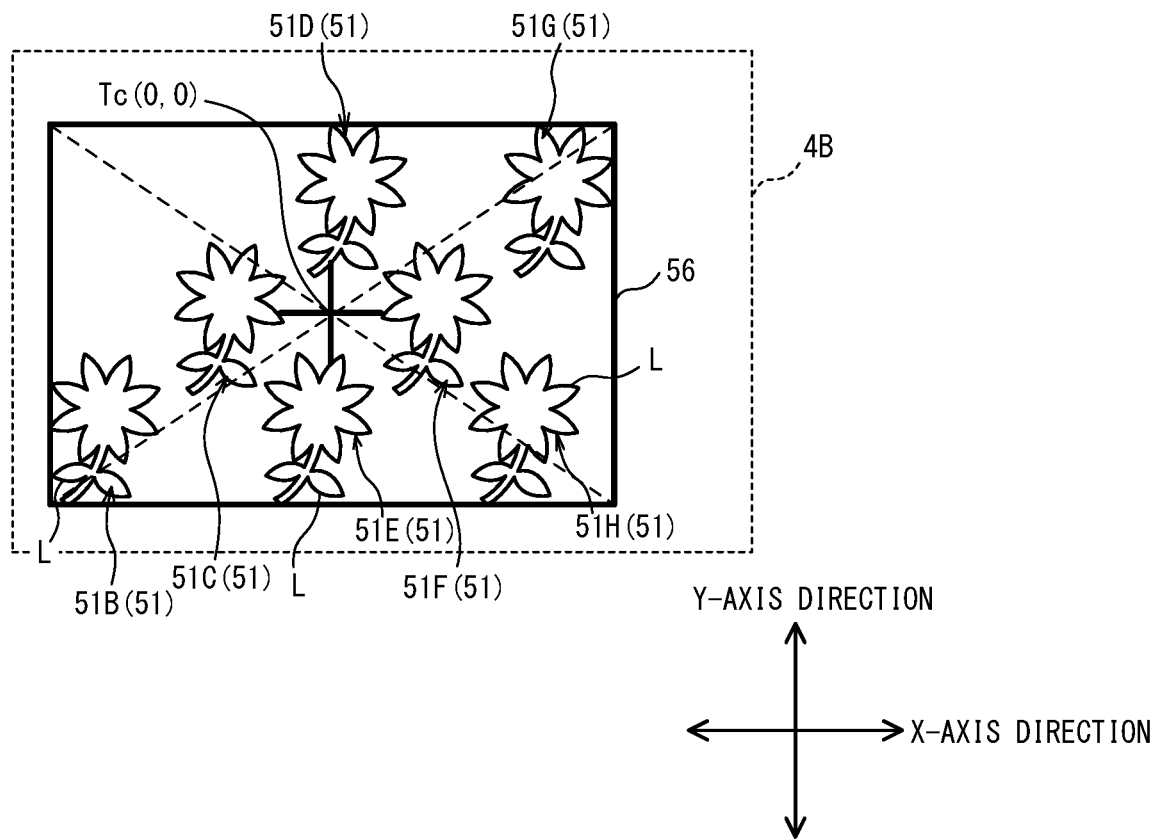
FIG. 10 is a view of a partial pattern and a closed region.

Next, the CPU 41 specifies, on the basis of the coordinate data associated with the group information of the partial patterns 51B to 51H, from among the cutting data D2, the outline of each of the selected partial patterns 51B to 51H. The CPU 41 specifies a closed region 56 (refer to FIG. 10) as a parameter indicating the size of the partial patterns 51B to 51H, on the basis of the cutting line L of the specified outline (step S49). FIG. 10 shows a specific example of the closed region 56. The closed region 56 is defined by the smallest rectangular region that envelopes all of the partial patterns 51B to 51H, i.e., a rectangular region within which the partial patterns 51B to 51H are inscribed. The sides of the closed region 56 extend parallel to the X-axis direction and the Y-axis direction. Next, the CPU 41 identifies the center Tc of the closed region 56. The center Tc corresponds to the position of the intersection of the diagonal lines of the closed region 56. The CPU 41 further specifies, as the size information, the coordinate information indicating the positions of the four corners of the closed region 56 on the XY coordinate system having the center Tc as the origin (0, 0).

Note that the origin of the size information is not limited to the center Tc. For example, the CPU 41 may use a corner representing the end portion of the closed region 56 on the negative direction side of the X-axis and an end portion of the closed region 56 on the negative direction side of the Y-axis as the origin (0, 0). Also, the CPU 41 may specify, as the size information, coordinate information indicating the positions of the four corners of the closed region 56 on an XY coordinate system having that corner as the origin.

As illustrated in FIG. 7, the CPU 41 further coordinate converts the coordinate data of the record associated with the group information of the partial patterns 51B to 51H selected by the processing at step S47, from among the cutting data D2, such that the center Tc (refer to FIG. 10) of the closed region 56 becomes the origin (0, 0) (step S51). The CPU 41 the moves the processing on to step S61 (refer to FIG. 8).

Figure 8:
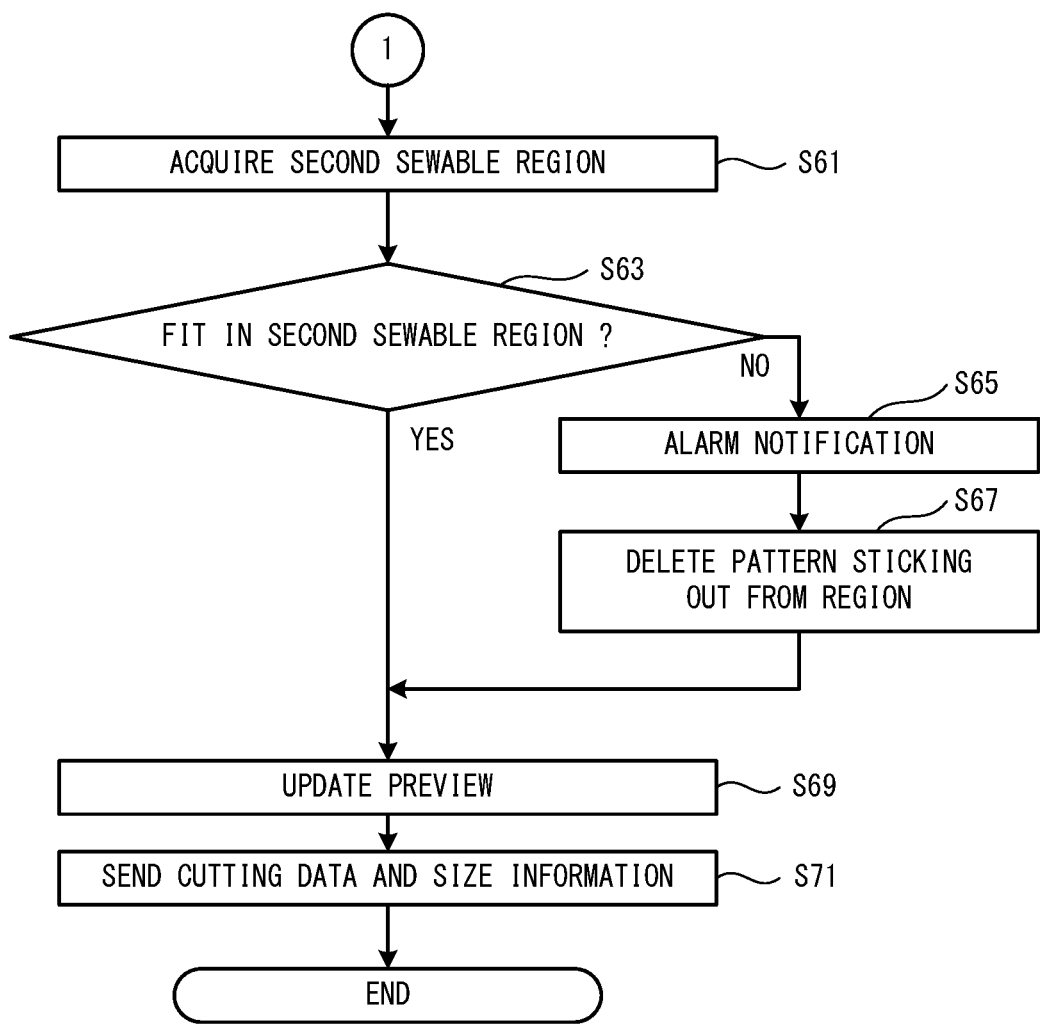
FIG. 8 is a flowchart of the cutting data send process, and is a continuation of FIG. 7.

As illustrated in FIG. 8, the CPU 41 acquires a sewable region (hereinafter, referred to as "second sewable region") 57 (refer to FIG. 11) inside the embroidery frame 3A (refer to FIG. 1) of the sewing machine 3, on the basis of the second frame information stored in the storage portion 42 (step S61). Note that the second frame information is stored in the storage portion 42 in response to an input operation performed by the user via the input portion 45. Note that the second frame information may be stored in advance in the storage portion 42 at the time of shipping of the cutting device 4.

Figure 11:
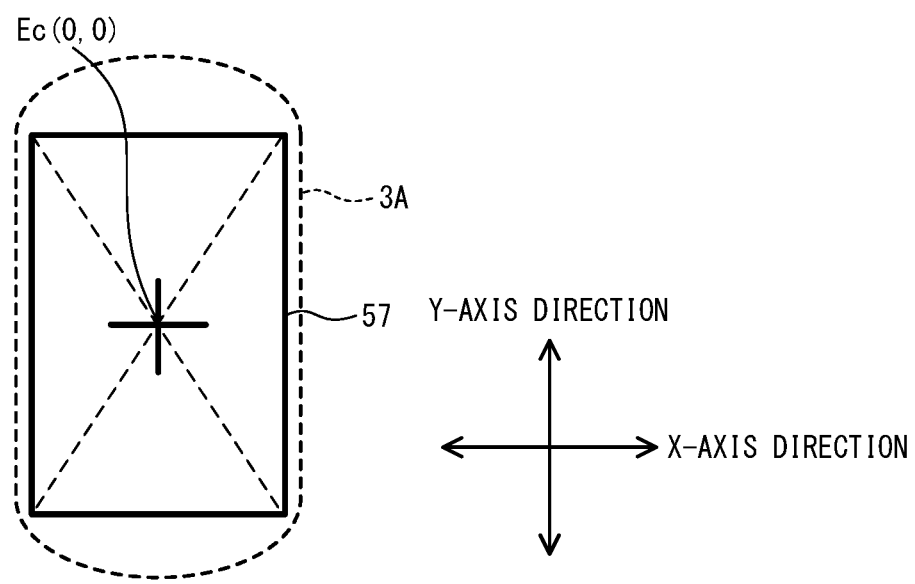
FIG. 11 is a view of a second sewable region.

FIG. 11 schematically shows the second sewable region 57. The second sewable region 57 has a rectangular shape. The center Ec of the second sewable region 57 corresponds to the position of intersection of diagonal lines of the second sewable region 57. The second sewable region 57 is defined by coordinate information indicating the positions of the four corners on an XY coordinate system in which the center Ec is the origin (0, 0). In FIG. 11, the X-axis direction matches the left-right direction, and the Y-axis direction matches the up-down direction. Also, the positive direction of the X-axis corresponds to the right direction, and the negative direction of the X-axis corresponds to the left direction. Also, the positive direction of the Y-axis corresponds to the downward direction and the negative direction of the Y-axis direction corresponds to the upward direction.

Note that the origin of the second sewable region 57 is not limited to the center Ec. For example, a corner, from among the four corners of the second sewable region 57, that corresponds to the end portion on the negative direction side of the X-axis and the end portion on the negative direction side of the Y-axis may be used as the origin (0, 0). Also, the second sewable region 57 may be defined by coordinate information indicating the positions of the four corners on an XY coordinate system having that corner as the origin.

The CPU 41 overlaps the positions of the centers Tc and Ec such that they are aligned, on the basis of the closed region 56 (refer to FIG. 10) indicated by the size information specified by the processing at step S49 (refer to FIG. 7), and the second sewable region 57 (refer to FIG. 11) acquired by the processing at step S61. In this state, the CPU 41 determines whether all of the partial patterns 51B to 51H contained in the closed region 56 will fit in the second sewable region 57 (step S63). If the CPU 41 determines that all of the partial patterns 51B to 51H will fit in the second sewable region 57 (yes at step S63), the CPU 41 moves the processing on to step S69. On other hand, if the CPU 41 determines that at least a portion of the partial patterns 51B to 51H will not fit in the second sewable region 57 (no at step S63), the CPU 41 moves the processing on to step S65.

Figure 12:
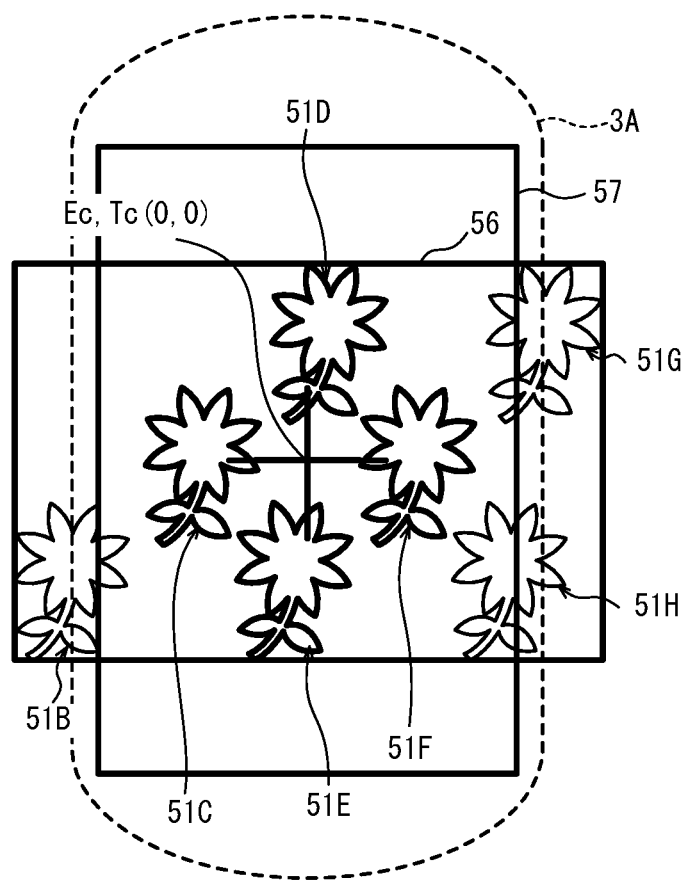
FIG. 12 is a view of a state in which the closed region overlaps with the second sewable region.

FIG. 12 shows a specific example of a case where at least a portion of the partial patterns 51B to 51H will not fit in the second sewable region 57. In a state in which the closed region 56 and the second sewable region 57 overlap, the partial patterns 51B, 51G, and 51H, from among the partial patterns 51B to 51H contained in the closed region 56, do not fit in the second sewable region 57, and portions of each stick out from the second sewable region 57. In such a case, the CPU 41 determines that at least a portion of the partial patterns 51B to 51H will not fit in the second sewable region 57 (no at step S63).

As illustrated in FIG. 8, the CPU 41 displays, on the display portion 44, an alarm notification screen providing notification that a portion of the partial patterns 51B to 51H selected by the processing at step S47 (refer to FIG. 7) will not fit in the second sewable region 57 (step S65). The CPU 41 deletes the record associated with the group information of the partial patterns 51B, 51G, and 51H that will not fit in the second sewable region 57, from among the cutting data D2 that includes coordinate data that has been coordinate-converted by the processing at step S51 (refer to FIG. 7) (step S67). As a result, the cutting data D2 will only include coordinate data of the partial patterns 51C to 51F that will fit in the second sewable region 57. The CPU 41 then moves the processing on to step S69.

Note that in the description above, the CPU 41 may delete only records that include coordinate data indicating positions outside of the second sewable region 57, from among the records associated with the group information of the partial patterns 51B, 51G, and 51H, and not delete records including coordinate data indicating positions inside the second sewable region 57.

The CPU 41 updates, on the basis of the cutting data D2, the preview image 70A (refer to FIG. 9) displayed on the display portion 44 by the processing at step S43 (refer to FIG. 7) (step S69). For example, as illustrated in FIG. 12, if it is determined that the partial patterns 51B, 51G, and 51H will not fit in the second sewable region 57, only pattern images 71C to 71F indicated by the cutting lines L of the partial patterns 51C to 51F that fit in the second sewable region 57 will be displayed on the display portion 44 as the preview image 70A. Meanwhile, the pattern images 71B, 71G, and 71H indicated by the cutting lines L of the partial patterns 51B, 51G, and 51H that do not fit in the second sewable region 57 will be deleted from the preview image 70A.

The CPU 41 sends, via the network line 10 and the access point 11, the cutting data D2 stored in the storage portion 42, and the size information specified by the processing at step S49 (refer to FIG. 7) (step S71). The CPU 41 then ends the cutting main process.

Server Main Process

Figure 13:
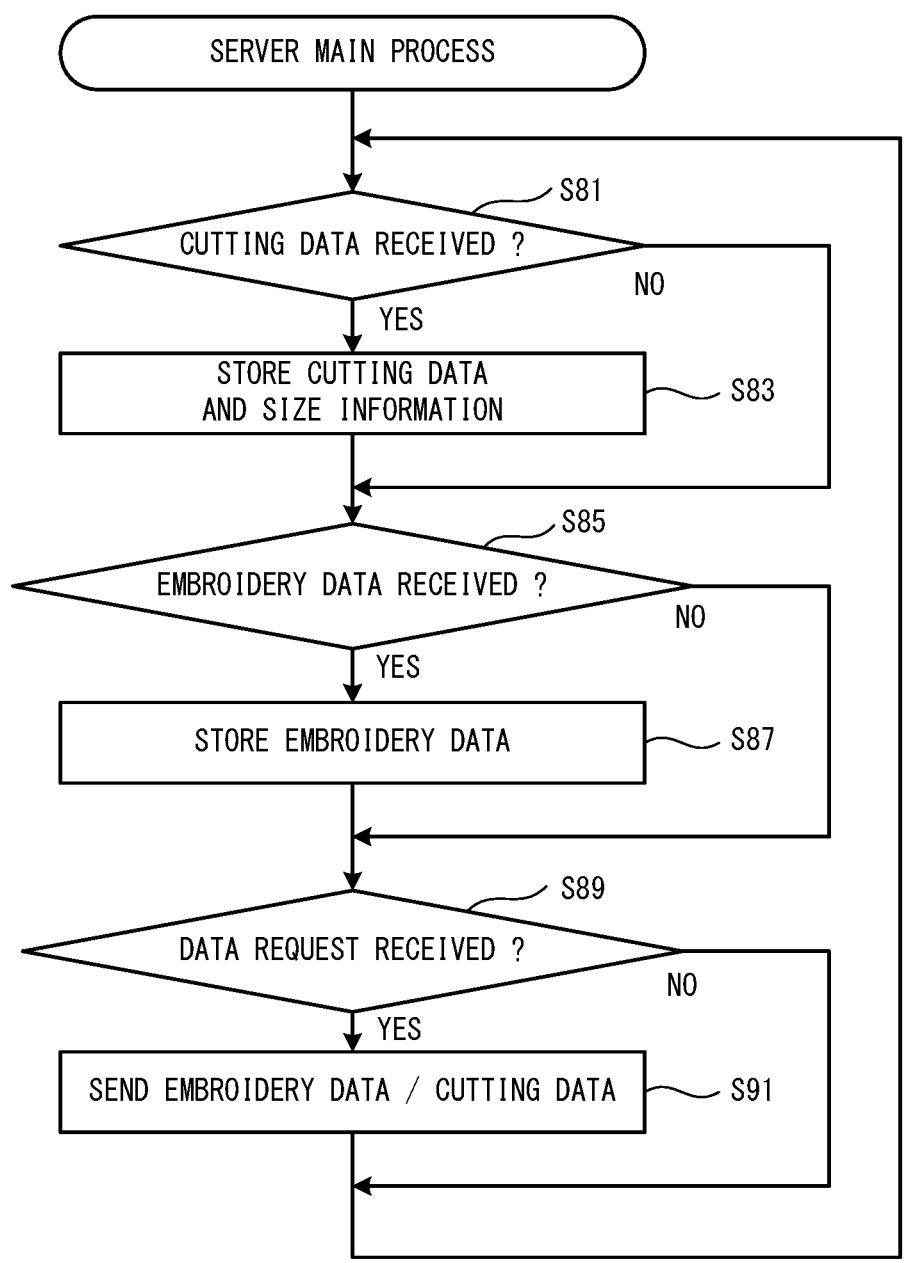
FIG. 13 is a flowchart of a server main process.

A server main process to be executed by the CPU 21 of the server device 2 will now be described with reference to FIG. 13. The server main process is started in response to the CPU 21 reading and executing the server program stored in the storage portion 22 when the power supply of the server device 2 is turned on.

The CPU 21 determines whether the cutting data and size information sent from the cutting device 4 has been received via the network line 10 and the access point 11 (step S81). If the CPU 21 determines that the cutting data and the size information has been received (yes at step S81), the CPU 21 stores the received cutting data and size information in the storage portion 22 (step S83). The CPU 21 then moves the processing on to step S85. If the CPU 21 determines that the cutting data and the size information have not been received (no at step S81), the CPU 21 moves the processing on to step S85.

The CPU 21 then determines whether the embroidery data sent from the sewing machine 3 has been received via the network line 10 and the access point 11 (step S85). Note that a detailed description will be omitted, but there may be cases in which the sewing machine 3 sends the embroidery data to the server device 2 via the network line 10 and the access point 11. If the CPU 21 determines that the embroidery data has been received (yes at step S85), the CPU 21 stores the received embroidery data in the storage portion 22 (step S87). The CPU 21 then moves the processing on to step S89. If the CPU 21 determines that the embroidery data has not been received (no at step S85), the CPU 21 moves the processing on to step S89.

The CPU 21 determines whether data sent from the sewing machine 3, i.e., a data request requesting the transmission of the cutting data or the embroidery data, has been received (step S89). The data request includes type data indicating the type of the cutting data or embroidery data. If the CPU 21 has received the data request (yes at step S89), the CPU 21 identifies whether the type data included in the data request indicates cutting data or embroidery data. If the CPU 21 identifies that the type data indicates cutting data, the CPU 21 sends the cutting data stored in the storage portion 22 to the sewing machine 3 via the network line 10 and the access point 11 (step S91). If the CPU 21 identifies that the type data indicates embroidery data, the CPU 21 sends the embroidery data stored in the storage portion 22 to the sewing machine 3 via the network line 10 and the access point 11 (step S91). The CPU 21 then returns the processing to step S81. If the CPU 21 determines that a data request has not been received (no at step S89), the CPU 21 returns the processing to step S81.

Sewing Main Process

A sewing main process executed by the CPU 31 of the sewing machine 3 will be described with reference to FIG. 14. The sewing main process starts in response to the CPU 31 reading and executing the sewing machine program stored in the storage portion 32 when the user performs, via the input portion 35, an operation to select the cutting data or embroidery data as the type of the data acquired from the server device 2.

The CPU 31 acquires the type of data (cutting data or embroidery data) selected by the operation performed via the input portion 35 (step S101). If the acquired type of data is cutting data, the CPU 31 sends a data request that includes the type data indicating cutting data to the server device 2 via the network line 10 and the access point 11 (step S103). If the acquired type of data is embroidery data, the CPU 31 sends a data request that includes the type of data indicating embroidery data to the server device 2 via the network line 10 and the access point 11 (step S103).

If the CPU 31 sends a data request that includes the type data indicating cutting data to the server device 2 (yes at step S105), the CPU 31 receives, via the network line 10 and the access point 11, the cutting data and size information sent from the server device 2 in response to the data request (step S107). Hereinafter, an example in which the cutting data D2 including a record associated with the group information of the partial patterns 51C to 51F illustrated in FIG. 12, and the size information of the closed region 56 illustrated in FIG. 10, will be described in detail.

The CPU 31 acquires a sewable region (hereinafter, referred to as a "first sewable region") 59 (refer to FIG. 15) inside the embroidery frame 3A of the sewing machine 3 (refer to FIG. 1), on the basis of the first frame information stored in the storage portion 32 (step S109). The first sewable region 59 indicates a sewable region of the largest embroidery frame 3A that can be mounted to the sewing machine 3. The first frame information is stored in advance in the storage portion 32 as initial information. The CPU 31 acquires the first sewable region 59 and specifies the center Gc (refer to FIG. 15).

Figure 15:
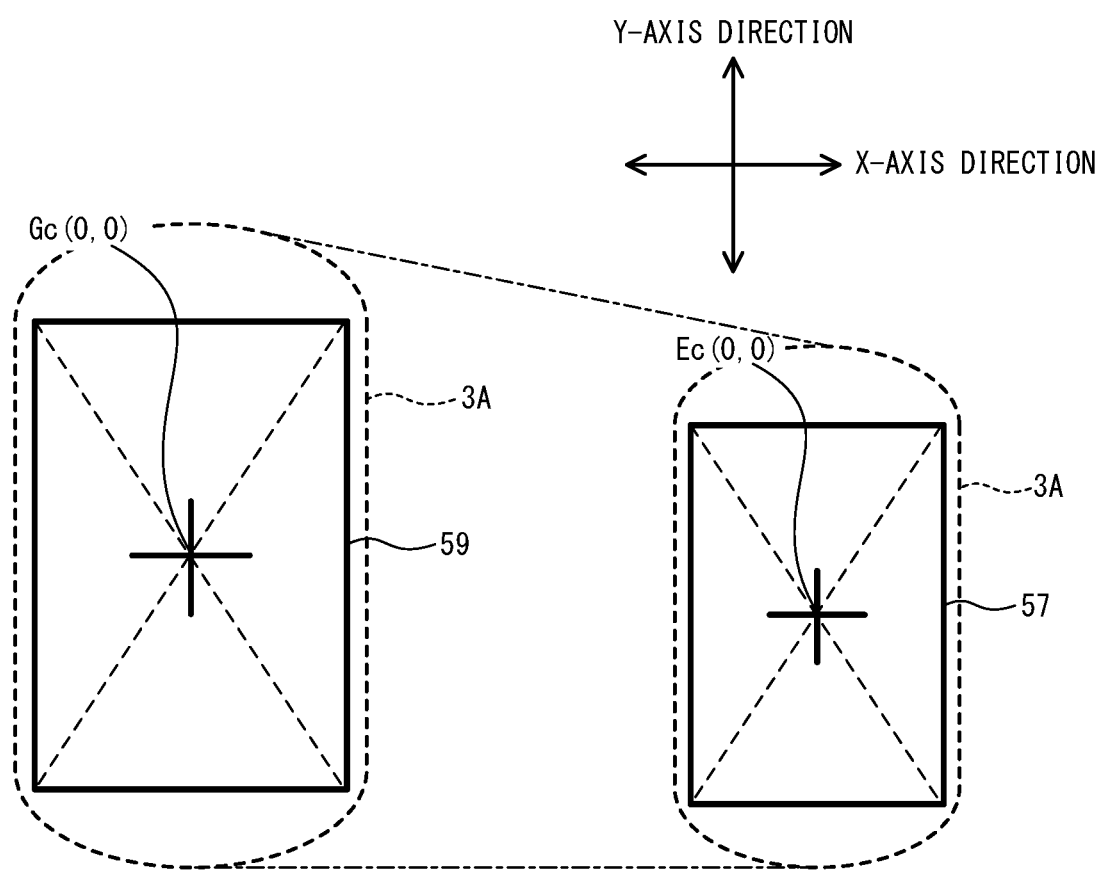
FIG. 15 is a view of a first sewable region.

FIG. 15 schematically shows the first sewable region 59. The first sewable region 59 has a rectangular shape. The center Gc of the first sewable region 59 corresponds to the position of the intersection of diagonal lines of the first sewable region 59. The first sewable region 59 is defined by coordinate information indicating the positions of four corners in an XY coordinate system of which the center Gc is the origin (0, 0). In FIG. 15, the X-axis direction matches the left-right direction, and the Y-axis direction matches the up-down direction. The positive direction of the X-axis corresponds to the right direction, and the negative direction of the X-axis corresponds to the left direction. The positive direction of the Y-axis corresponds to the downward direction, and the negative direction of the Y-axis corresponds to the upward direction.

Note that because the first sewable region 59 indicates the sewable region of the largest embroidery frame 3A that can be mounted to the sewing machine 3, the first sewable region 59 may be larger than the second sewable region 57 indicated by the second frame information stored in the storage portion 42 of the cutting device 4. However, depending on the second frame information set in the cutting device 4 by the user via the input portion 45, the first sewable region 59 may also be smaller than the second sewable region 57.

Note that the origin of the first sewable region 59 is not limited to the center Gc. For example, a corner that corresponds to the end portion on the negative direction side of the X-axis and the end portion on the negative direction side of the Y-axis, from among the four corners of the first sewable region 59, may be used as the origin (0, 0). The first sewable region 59 may be defined by coordinate information indicating the positions of the four corners on an XY coordinate system having that corner as the origin.

Figure 14:
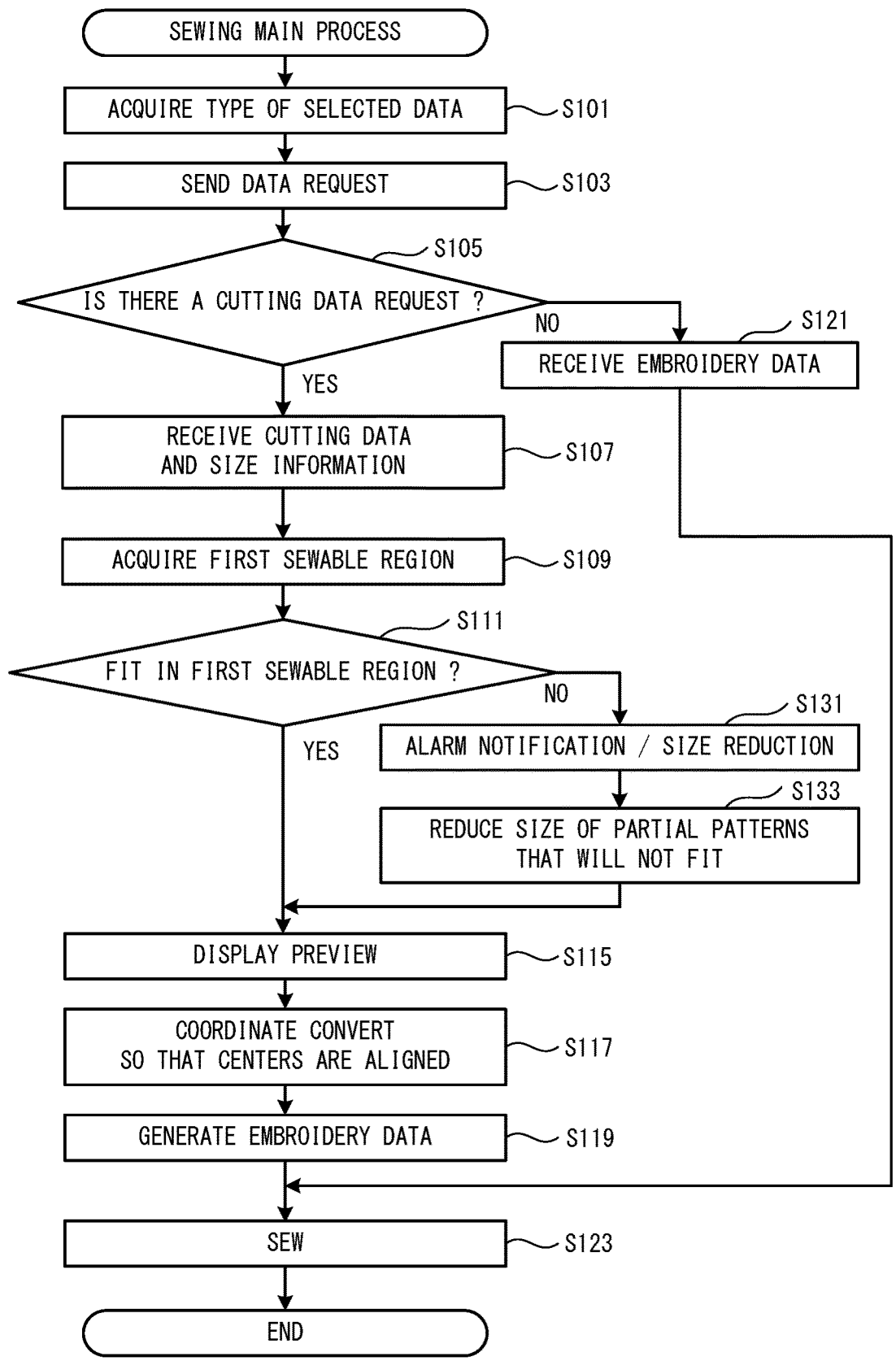
FIG. 14 is a flowchart of a sewing main process.

As illustrated in FIG. 14, the CPU 31 acquires the closed region 56 (refer to FIG. 10) and specifies the center Tc (refer to FIG. 10) on the basis of the size information received by the processing at step S107. Moreover, the CPU 31 further specifies the partial patterns 51C to 51F contained in the closed region 56, on the basis of the record in the cutting data D2 received by the processing at step S107.

The CPU 31 overlaps the positions of the centers Gc and Tc of the first sewable region 59 and the closed region 56, respectively, so that they are aligned. In this state, the CPU 31 determines whether the partial patterns 51C to 51F contained in the closed region 56 will all fit in the first sewable region 59 (step S111). If the CPU 31 determines that the partial patterns 51C to 51F will all fit in the first sewable region 59 (yes at step S111), the CPU 31 moves the processing on to step S115.

Figure 16:
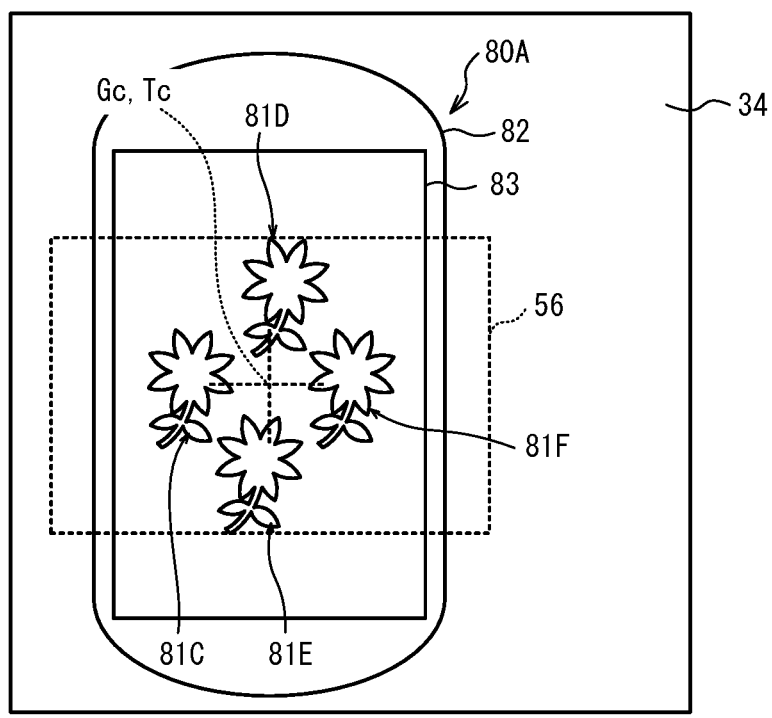
FIG. 16 is a view of a preview image.

The CPU 31 displays, on the display portion 34, a preview image 80A (refer to FIG. 16) for previewing the embroidery pattern to be sewn by the sewing machine 3 on the basis of the cutting data D2 (step S115). FIG. 16 shows an example of the preview image 80A displayed on the display portion 34. The preview image 80A includes pattern images 81C to 81F indicating the partial patterns 51C to 51F (refer to FIG. 12), respectively. The preview image 80A also includes a frame image 82 indicating the embroidery frame 3A, and a region image 83 indicating the first sewable region 59 (refer to FIG. 15). Note that in the preview image 80A, the positional relationship between the pattern images 81C to 81F, and the frame image 82 and the region image 83, is adjusted so as to become a positional relationship in which the center Gc of the first sewable region 59 is aligned with the center Tc of the closed region 56 specified by the size information.

The CPU 31 coordinate converts the coordinate data in the cutting data D2 such that the center Tc of the closed region 56 specified on the basis of the size information is aligned with the center Gc of the first sewable region 59 (step S117). Moreover, the CPU 31 generates embroidery data necessary for the sewing machine 3 to sew the embroidery pattern, by vector expanding the coordinate data on the basis of the setting information included in the header information of the cutting data D2 (step S119). The CPU 31 controls the sewing portion 33 on the basis of the generated embroidery data. As a result, the CPU 31 sews the embroidery pattern corresponding to the partial patterns 51C to 51F on the object 30 to be sewn (step S123). The CPU 31 then ends the sewing main process.

On the other hand, if the CPU 31 determines that at least a portion of the partial patterns 51C to 51F contained in the closed region 56 will not fit in the first sewable region 59 (no at step S111), the CPU 31 moves the processing on to step S131. The CPU 31 then displays, on the display portion 34, an alarm notification screen providing notification that a portion of the partial patterns 51C to 51F indicated by the cutting data D2 received from the cutting device 4 via the server device 2 will not fit in the first sewable region 59 (step S131). Also, the CPU 31 reduces the size of the partial patterns 51 that will not fit in the first sewable region 59, from among the partial patterns 51C to 51F, such that those partial patterns 51 will fit in the first sewable region 59 (step S133). Further, the CPU 31 changes, in accordance with the reduction in size of the partial patterns 51, the coordinate data, in the cutting data D2, of the records associated with the group information of the partial patterns 51 that will not fit in the first sewable region 59 (step S133). The CPU 31 then moves the processing on to step S115. The processing at steps S115 to S123 is the same as that when the partial patterns 51C to 51F all fit in the first sewable region 59, so a description thereof will be omitted.

Also, if the CPU 31 sends a data request that includes type data indicating embroidery data to the server device 2 (no at step S105), the CPU 31 will receive, via the network line 10 and the access point 11, the embroidery data sent from the server device 2 in response to that data request (step S121). The CPU 31 controls the sewing portion 33 on the basis of the received embroidery data. As a result, the CPU 31 sews the embroidery pattern to the object 30 to be sewn (step S123). The CPU 31 then ends the sewing main process.

OPERATION AND EFFECTS OF THE PRESENT EMBODIMENT

The sewing machine 3 receives, via the network line 10 and access point 11, the cutting data sent from the cutting device 4 (step S107). The sewing machine 3 then generates the embroidery data on the basis of the received cutting data (step S119), and performs sewing on the basis of the generated embroidery data (step S123). By linking up with the cutting device 4, the sewing machine 3 can acquire the cutting data from the cutting device 4 and generate the embroidery data required during sewing.

The sewing machine 3 determines whether all of the partial patterns 51C to 51F contained in the closed region 56 will fit in the first sewable region 59 (step S111). The user of the sewing machine 3 does not need to determine whether the partial patterns 51C to 51F will fit in the first sewable region 59. Therefore, the user can easily cause the sewing machine 3 to execute sewing of the embroidery patterns corresponding to the partial patterns 51C to 51F that fit in the first sewable region 59.

The cutting device 4 specifies, by the closed region 56, the size information indicating the size of the partial patterns 51B to 51H. In this case, the cutting device 4 does not need to specify the size information taking the individual partial patterns 51 into account. Therefore can easily specify the size information.

Each of the plurality of records of the cutting data is associated with group information that is information indicating the partial patterns 51. Therefore, the sewing machine 3 can easily identify, on the basis of the group information, which partial pattern each piece of coordinate data included in the cutting data belongs to.

The sewing machine 3 coordinate converts the coordinate data of the cutting data such that the center Tc of the closed region 56 specified on the basis of the size information is aligned with the center Gc of the first sewable region 59 (step S117). The sewing machine 3 generates embroidery data on the basis of the cutting data that includes the coordinate-converted coordinate data (step S119). In this case, the sewing machine 3 can easily arrange the partial patterns 51C to 51F specified on the basis of the cutting data sent from the cutting device 4, inside the first sewable region 59.

When the sewing machine 3 receives sewing machine-inexecutable information and generates embroidery data on the basis of this sewing machine-inexecutable information, the sewing operation of the embroidery pattern to be performed on the basis of the generated embroidery data may become unstable. With respect to this, if sewing machine-inexecutable information is included in the setting information of the header information of the cutting data (yes at step S33), the cutting device 4 deletes the sewing machine-inexecutable information from the header information (step S35). That is, cutting data in which the sewing machine-inexecutable information has been deleted from the header information is sent from the cutting device 4 to the sewing machine 3. Therefore, the cutting device 4 is able to reduce the likelihood of the sewing operation of an embroidery pattern to be executed by the sewing machine 3 on the basis of the cutting data from becoming unstable.

The cutting device 4 displays, on the display portion 44, the preview image 70A for previewing the embroidery pattern to be sewn by the sewing machine 3 on the basis of the cutting data (step S43). If the sewing machine-inexecutable information is deleted from the header information of the cutting data, the preview image 70A will be generated on the basis of the cutting data from which the sewing machine-inexecutable information has been deleted. In this case, the preview image 70A is displayed in a mode in which the embroidery pattern to be sewn by the sewing machine 3 on the basis of the cutting data D1 is well reflected. Therefore, the user of the cutting device 4 is able to check the embroidery pattern that will actually be sewn by the sewing machine 3.

If the cutting device 4 determines that a non-supported editable item is included in the editable items (yes at step S39), the cutting device 4 sets the non-supported editable item as a hidden item in order to exclude the non-supported editable item from the eligible editable items to be displayed on the display portion 44 (step S41). Therefore, the cutting device 4 is able to inhibit cutting data in which information relating to processing unable to be supported by the sewing machine 3 during sewing has been edited from being sent to the sewing machine 3.

The cutting device 4 determines whether the partial patterns 51C to 51F contained in the closed region 56 will all fit in the second sewable region 57 (step S63). In this case, the user does not have to determine whether the partial patterns 51C to 51F will fit in the second sewable region 57. Therefore, the user can execute, by a simple procedure, the sewing of the partial patterns 51C to 51F by the sewing machine 3.

If at least a portion of the partial patterns 51C to 51F will not fit in the second sewable region 57 (no at step S63), the cutting device 4 displays the alarm notification screen on the display portion 44 (step S65). As a result, the user can recognize, by the alarm notification screen, that at least a portion of the partial patterns 51C to 51F will not fit in the second sewable region 57. Also, in this case, the cutting device 4 deletes the records associated with the group information of the partial patterns 51B, 51G, and 51H that will not fit in the second sewable region 57, from among the cutting data D2 (step S67). In this case, the cutting device 4 sends only the cutting data for the partial patterns 51C to 51F that will fit in the second sewable region 57 to the server device 2, so the amount of data that will be sent can be reduced.

The sewing machine 3 reduces the size of the partial patterns 51B, 51G, and 51H that will not fit in the first sewable region 59 so that they will fit in the first sewable region 59 (step S133). As a result, the sewing machine 3 is also able to sew the partial patterns 51B, 51G, and 51H that will not fit in the first sewable region 59 by reducing their size.

MODIFIED EXAMPLES

The present disclosure is not limited to the foregoing embodiment; various modifications are possible. The cutting device 4 sends the cutting data and size information to the server device 2, and the sewing machine 3 receives the cutting data and size information from the server device 2. In contrast, the cutting device 4 may send the cutting data and size information directly to the sewing machine 3 via the access point 11. Also, the sewing machine 3 and the cutting device 4 may be capable of direct communication without going through the access point 11, by various well-known wireless communication methods. In this case, the cutting device 4 may send the cutting data and size information directly to the sewing machine 3 via wireless communication.

The sewing machine 3 determines whether all of the partial patterns 51C to 51F will fit in the first sewable region 59 indicating the sewable region of the largest embroidery frame 3A that can be mounted to the sewing machine 3 (step S111). In contrast, the sewing machine 3 may determine whether all of the partial patterns 51C to 51F will fit in the sewable region where sewing is possible of the embroidery frame 3A that is actually mounted to the sewing machine 3. Also, the sewing machine 3 may sew the embroidery pattern indicating the partial patterns 51C to 51F onto the object 30 to be sewn regardless of whether all of the partial patterns 51C to 51F will fit in the first sewable region 59.

The shape of the closed region 56 specified by the cutting device 4 is not limited to a rectangular shape, and may be another shape such as a polygon, a circle, or an oval. Also, the cutting device 4 may send only the cutting data to the sewing machine 3 without specifying the closed region 56.

The group information of the cutting data is not limited to the mode of the embodiment described above. For example, the group information may be table information that manages the record of each of the partial patterns 51 in a table. One piece of header information of the cutting data may be provided for each group divided for each of the partial patterns 51.

The sewing machine 3 may coordinate convert the coordinate data of the cutting data such that one of the four corners of the closed region 56 specified on the basis of the size information matches one of the four corners of the first sewable region 59 (step S117).

The cutting device 4 does not have to delete the sewing machine-inexecutable information from the header information of the cutting data. In this case, the cutting device 4 may generate and display the preview image 70A on the basis of cutting data that includes the sewing machine-inexecutable information. Also, if such cutting data is sent from the cutting device 4 to the sewing machine 3, the sewing machine 3 may determine that the sewing machine-inexecutable information is included in the setting information of the header information of the cutting data. If the sewing machine-inexecutable information is included, the sewing machine 3 may delete this sewing machine-inexecutable information from the header information.

The editing images 60B (refer to FIG. 6) and 70B (refer to FIG. 9) may include selection buttons corresponding to the same editable items A to C. In this case, for example, operation with respect to the editable item C in the editing image 70B may be prohibited by displaying the selection button corresponding to the editable item C so that it is translucent or the like.

The cutting device 4 does not have to perform the processing at steps S63, S65, and S67. That is, the cutting device 4 does not have to determine whether the partial patterns 51 contained in the closed region 56 will fit in the second sewable region 57. Note that in this case as well, the determination of whether the partial patterns 51 contained in the closed region 56 will fit in the first sewable region 59 is made in the sewing machine 3 (step S111), so it is possible to prevent the embroidery pattern indicating the partial patterns 51 that will not fit in the first sewable region 59 from being sewn.

The cutting device 4 may prohibit the transmission of the cutting data to the sewing machine 3 when not all of the partial patterns 51B to 51H will fit in the second sewable region 57.

If it is determined that a portion of the partial patterns 51C to 51F will not fit in the first sewable region 59 (no at step S133), the sewing machine 3 may prohibit the sewing of all of the embroidery patterns of the partial patterns 51C to 51F. In this case, the sewing machine 3 can inhibit only a portion of the partial patterns 51C to 51F defined by the cutting data sent from the cutting device 4 from being sewn.

The server device 2 receives the cutting data and size information from the cutting device 4, stores this cutting data and size information in the storage portion 22, and sends the cutting data and size information to the sewing machine 3 upon request. In contrast, the server device 2 may send the cutting data and size information to another device (for example, another cutting device 4 or the like; hereinafter, referred to as "processing device") that processes an object to be processed using the cutting data and size information. Also, in this case, the cutting device 4 may determine whether the partial patterns 51C to 51F contained in the closed region 56 will fit in a processable region indicating a region where processing is possible, of the processing device (step S63). Also, if the partial patterns 51C to 51F will not fit in the processable region (no at step S63), the cutting device 4 may display the alarm notification screen on the display portion 44 (step S65). Furthermore, the cutting device 4 may delete the records associated with the group information of the partial patterns 51 that will not fit in the processable region, of the cutting data D2, and send only the cutting data of the partial patterns 51 that will fit in the processable region to the processing device via the server device 2 (step S71).

The cutting data that the cutting device 4 acquires by the processing at step S31 may be data after the cutting pattern has been edited, e.g., enlarged or reduced in size, rotated or inverted, moved so as to be offset, or the layout thereof has been changed. Also, this cutting data may be data that has undergone processing such as smoothing in advance. The cutting device 4 may send the cutting data that has been read and acquired from the storage portion 42 as it is to the sewing machine 3 via the server device 2.

The cutting device 4 may acquire the first frame information stored in the storage portion 32 of the sewing machine 3 from the sewing machine 3. The cutting device 4 may determine whether all of the partial patterns 51 will fit in the first sewable region 59 indicated by the acquired first frame information when the processing at step S63 is executed.

In the description above, the cutting device 4 specifies, as the size information, the coordinate information indicating the positions of the four corners of the closed region 56 in an XY coordinate system having the center Tc as the origin (0, 0). In contrast, the cutting device 4 may specify, as the size information, the lengths in each of the X-axis direction and the Y-axis direction of the closed region 56.

Even if it is determined that a portion of the partial patterns 51, from among the plurality of partial patterns 50, will not fit in the first sewable region 59 (no at step S111), the sewing machine 3 may sew, as the embroidery pattern, the portions of these partial patterns 51 that are arranged inside the first sewable region 59.

The apparatus and methods described above with reference to the various embodiments are merely examples. It goes without saying that they are not confined to the depicted embodiments. While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. A sewing system including a cutting device and a sewing machine, the cutting device comprising:
a cutting portion configured to cut an object to be cut held by a holding frame, based on cutting data for cutting a cutting pattern formed from at least one partial pattern;
a cutter communication portion configured to perform communication via at least one of a network line or at least one of wireless communication;
a cutter processor; and
a cutter memory configured to store computer-readable instructions that, when executed by the cutter processor, instruct the cutter processor to perform processes comprising:
a cutter first acquisition process to acquire the cutting data; and
a cutter send process to send, via at least one of the network line or at least one of the wireless communication by the cutter communication portion, the cutting data acquired by the cutter first acquisition process; and the sewing machine comprising:
a sewing portion configured to sew an embroidery pattern onto an object to be sewn held by an embroidery frame, based on embroidery data for sewing the embroidery pattern;
a sewing communication portion configured to perform communication via at least one of the network line or at least one of the wireless communication,
a sewing processor; and
a sewing memory configured to store computer-readable instructions that, when executed by the sewing processor, instruct the sewing processor to perform processes comprising:
a sewing receiving process to receive, via at least one of the network line or at least one of the wireless communication by the sewing communication portion, the cutting data sent by the cutting device;
a generation process to generate the embroidery data, based on the cutting data received by the sewing receiving process; and
a sewing process to sew on the object to be sewn, based on the embroidery data generated by the generation process.

2. The sewing system according to claim 1, wherein
the computer-readable instructions stored in the cutter memory instruct the cutter processor to perform processes further comprising:
a size specification process to specify size information indicating the size of the at least one partial pattern, wherein
the cutter send process sends the cutting data and the size information specified by the size specification process, and
the sewing receiving process receives the size information and the cutting data, the computer-readable instructions stored in the sewing memory instruct the sewing processor to perform processes further comprising:
  a sewing acquisition process to acquire a sewable region indicating a sewable region inside the embroidery frame; and
  a sewing determination process to determine whether the at least one partial pattern will fit in the sewable region, based on the sewable region acquired by the sewing acquisition process, and the size information received by the sewing receiving process.

3. The sewing system according to claim 2, wherein the size information indicates the smallest closed region inside of which the at least one partial pattern is inscribed.

4. The sewing system according to claim 3, wherein the at least one partial pattern is two or more partial patterns, and
the cutting data includes position information which is information indicating each position of a plurality of points on a cutting line when the two or more partial patterns are cut, and which is based on a specific point of the closed region, and group information indicating which partial pattern, from among the two or more partial patterns, the position information belongs to.

5. The sewing system according to claim 3, wherein the sewing process sews on the object to be sewn, in a state in which the at least one partial pattern is arranged in the sewable region, such that a center of the closed region is aligned with a center of the sewable region.

6. The sewing system according to claim 1, wherein the computer readable instructions stored in the cutter memory instruct the cutting processor to perform processes further comprising:
  a cutter first determination process to determine whether inexecutable information indicating a process unable to be executed by the sewing machine is included in the cutting data acquired by the cutter first acquisition process; and
  a deletion process to delete the inexecutable information from the cutting data if it is determined by the cutter first determination process that the inexecutable information is included in the cutting data.

7. The sewing system according to claim 6, wherein the computer-readable instructions stored in the cutter memory instruct the cutter processor to perform processes further comprising:
  a cutter first display process to display, on a display of the cutting device, an image showing the at least one partial pattern, based on the cutting data from which the inexecutable information has been deleted by the deletion process.

8. The sewing system according to claim 1, wherein the computer-readable instructions stored in the cutter memory instruct the cutter processor to perform processes further comprising:
  a cutter second display process to not display, on a display of the cutting device, a related editable item related to a process unable to be executed by the sewing machine, when editing the cutting data to be sent to the sewing machine, and to display, on the display of the cutting device, the related editable item when editing the cutting data for cutting the object to be cut.

9. The sewing system according to claim 1, wherein the computer-readable instructions stored in the cutter memory instruct the cutter processor to perform processes further comprising:
  a size specification process to specify size information indicating the size of the at least one partial pattern;
  a cutter second acquisition process to acquire a sewable region indicating a sewable region inside the embroidery frame of the sewing machine; and
  a cutter second determination process to determine whether the at least one partial pattern will fit in the sewable region, based on the sewable region acquired by the cutter second acquisition process and the size information specified by the size specification process.

10. The sewing system according to claim 9, wherein the computer-readable instructions stored in the cutter memory instruct the cutter processor to perform processes further comprising:
  a notification process to provide notification when it has been determined by the cutter second determination process that the at least one partial pattern will not fit in the sewable region.

11. The sewing system according to claim 9, wherein the cutter send process sends, when it has been determined by the cutter second determination process that the at least one partial pattern will not fit in the sewable region, the cutting data of a partial pattern that will fit in the sewable region, from among the at least one partial pattern.

12. The sewing system according to claim 2, wherein the computer-readable instructions stored in the sewing memory instruct the sewing processor to perform processes further comprising:
  a control process to, if it has been determined by the sewing determination process that the at least one partial pattern will not fit in the sewable region, reduce the size of the at least one partial pattern, or prohibit sewing of the at least one partial pattern by the sewing process.

13. A cutting device comprising:
a cutting portion configured to cut an object to be cut held by a holding frame, based on cutting data for cutting a cutting pattern formed from at least one partial pattern;
a cutter communication portion configured to perform communication via at least one of a network line or at least one of wireless communication;
a cutter processor; and
a cutter memory configured to store computer-readable instructions that, when executed by the cutter processor, instruct the cutter processor to perform processes comprising:
  a cutter first acquisition process to acquire the cutting data;
  a size specification process to specify size information indicating the size of the at least one partial pattern; and
  a cutter send process to send, to another device via at least one of the network line or at least one of the wireless communication by the cutter communication portion, the cutting data acquired by the cutter first acquisition process, and the size information specified by the size specification process.

14. The cutting device according to claim 13, wherein the at least one partial pattern is two or more partial patterns, and the cutting data includes position information indicating each position of a plurality of points on a cutting line when the two or more partial patterns are cut, and group information indicating which partial pattern, from among the two or more partial patterns, the position information belongs to.

15. The cutting device according to claim 13, wherein the computer-readable instructions stored in the cutter memory instruct the cutter processor to perform processes further comprising:
a cutter first determination process to determine whether inexecutable information indicating a process unable to be executed by the other device is included in the cutting data acquired by the cutter first acquisition process; and
a deletion process to delete the inexecutable information from the cutting data if it is determined by the cutter first determination process that the inexecutable information is included in the cutting data.

16. The cutting device according to claim 13, wherein the computer-readable instructions stored in the cutter memory instruct the cutter processor to perform processes further comprising:
a cutter second acquisition process to acquire a processable region indicating a processable region of the other device; and
a cutter second determination process to determine whether the at least one partial pattern will fit in the processable region, based on the processable region acquired by the cutter second acquisition process and the size information specified by the size specification process.

17. The cutting device according to claim 16, wherein the computer-readable instructions stored in the cutter memory instruct the cutter processor to perform processes further comprising:
a notification process to provide notification when it has been determined by the cutter second determination process that the at least one partial pattern will not fit in the processable region.

18. The cutting device according to claim 16, wherein the cutter send process sends, when it has been determined by the cutter second determination process that the at least one partial pattern will not fit in the processable region, the cutting data of a partial pattern that will fit in the processable region, from among the at least one partial pattern.

* * * * *